(12) United States Patent
Shimoyama

(10) Patent No.: US 11,027,588 B2
(45) Date of Patent: Jun. 8, 2021

(54) AIR CONDITIONING UNIT FOR VEHICLE

(71) Applicant: DENSO CORPORATION, Kariya (JP)

(72) Inventor: Yohei Shimoyama, Kariya (JP)

(73) Assignee: DENSO CORPORATION, Kariya (JP)

( * ) Notice: Subject to any disclaimer, the term of this patent is extended or adjusted under 35 U.S.C. 154(b) by 277 days.

(21) Appl. No.: 15/999,489

(22) PCT Filed: Jan. 25, 2017

(86) PCT No.: PCT/JP2017/002493
§ 371 (c)(1),
(2) Date: Aug. 20, 2018

(87) PCT Pub. No.: WO2017/145618
PCT Pub. Date: Aug. 31, 2017

(65) Prior Publication Data
US 2020/0062073 A1 Feb. 27, 2020

(30) Foreign Application Priority Data

Feb. 22, 2016 (JP) .............................. JP2016-031363

(51) Int. Cl.
*B60H 1/00* (2006.01)
(52) U.S. Cl.
CPC ..................... *B60H 1/00064* (2013.01); *B60H 2001/00092* (2013.01)
(58) Field of Classification Search
CPC ................. B60H 1/0064; B60H 2001/00092
USPC ........................................................ 454/156
See application file for complete search history.

(56) References Cited

U.S. PATENT DOCUMENTS

| 8,544,533 B2 * | 10/2013 | Lee ..................... B60H 1/00064 165/202 |
| 2010/0018472 A1 * | 1/2010 | Porter .................. A01K 13/001 119/606 |
| 2011/0117829 A1 * | 5/2011 | Ikeda .................. B60H 1/00064 454/155 |
| 2018/0029441 A1 | 2/2018 | Nakanishi |

FOREIGN PATENT DOCUMENTS

| EP | 1445133 A2 | 8/2004 |
| JP | 2004237940 A | 8/2004 |
| JP | 2007269082 A | 10/2007 |
| JP | 2008143514 A | 6/2008 |

(Continued)

*Primary Examiner* — Steven B McAllister
*Assistant Examiner* — Charles R Brawner
(74) *Attorney, Agent, or Firm* — Harness, Dickey & Pierce, P.L.C.

(57) ABSTRACT

An air conditioner for a vehicle includes an air conditioning case and a case interior member in the air conditioning case. The case interior member includes a tunnel member and a tunnel exterior guide wall. The tunnel member defines a tunnel channel therein and is arranged in a downstream space defined in an air conditioning case. The tunnel exterior guide wall is configured to guide an air to flow from a warm air passage to an outside of the tunnel channel. A first direction along which the tunnel exterior guide wall extends is closer to a direction, which is opposite to the one direction along which the air flowing from a cool air passage into the downstream space, as compared to a second direction along which the tunnel guide wall extends.

8 Claims, 16 Drawing Sheets

(56) References Cited

FOREIGN PATENT DOCUMENTS

| JP | 2009227026 A | 10/2009 |
| JP | 2011105175 A | 6/2011 |
| WO | WO-2016166957 A1 | 10/2016 |
| WO | WO-2017145617 A1 | 8/2017 |

* cited by examiner

AIR CONDITIONING UNIT FOR VEHICLE

CROSS REFERENCE TO RELATED APPLICATIONS

This application is a U.S. National Phase Application under 35 U.S.C. 371 of International Application No. PCT/JP2017/002493 filed on Jan. 25, 2017 and published in Japanese as WO/2017/145618 A1 on Aug. 31, 2017. This application is based on and claims the benefit of priority from Japanese Patent Application No. 2016-031363 filed on Feb. 22, 2016. The entire disclosures of all of the above applications are incorporated herein by reference.

TECHNICAL FIELD

The present disclosure relates to an air conditioning unit for a vehicle that performs air conditioning for a vehicle compartment of the vehicle.

BACKGROUND

Patent Literature 1 discloses an example of such air conditioning units for a vehicle. The air conditioning unit disclosed by Patent Literature 1 includes a case and an air guide. The case defines a warm air passage (or a hot air passage), a cool-air bypass passage (or a cool air passage), and a junction area where the warm air passage and the cool air passage are connected to each other. The air guide is arranged in the junction area.

The air guide may be referred to as a grid. For example, in the air guide, a warm air tunnel, into which air flows from the warm air passage defined in the case, and a path, into which air flows from the cool air passage defined in the case, are arranged side-by-side. With such a configuration, the air guide is configured to reduce a temperature variation or a temperature difference in an up-down direction in air that is discharged from the air conditioning unit.

PRIOR ART LITERATURE

Patent Literature

Patent Literature 1: JP 2009-227026 A

SUMMARY

For example, in the grid such as the air guide described in Patent Literature 1, an angle formed by a direction, along which a warm air passing through the warm air tunnel, relative to a direction, along which a cool air flows out of the cool air passage, is generally the same or substantially the same as an angle formed by a direction, along which the warm air not passing through the warm air tunnel flows, relative to the direction, along which the cool air flows out of the cool air passage.

However, when the two angles are equal to or similar to each other, the cool air and the warm air flowing out of the warm air tunnel may not be mixed with each other sufficiently. For example, such concern may be raised when an interior layout of the case is designed so that a distance from the grid to the outlet of the case is short and that the cool air flows across a space, in which the grid is arranged, from one side to the other side. As a result, it may be difficult to reduce the temperature variation in the air discharged from the air conditioning unit.

For avoiding such an abnormality, the warm air tunnel may be divided into a plurality of paths to reduce the temperature variation. However, when the warm air tunnel is divided into a plurality of paths, a pressure loss in the air conditioning unit may increase due to an increase of a ventilation resistance caused by the grid. As such, a volume of the air discharged from the air conditioning unit may be reduced. At the same time, the grid may cause noise. The above-described facts have been found by the inventors of the present disclosure.

The present disclosure addresses the foregoing issues. Thus, it is an objective of the present disclosure to provide an air conditioning unit for a vehicle that can suppress an increase of a pressure loss in the air conditioning unit caused by a grid and that can reduce a temperature variation in air discharged from the air conditioning unit.

In order to achieve the above-described objective, according to an aspect of the present disclosure, an air conditioning unit, which is configured to perform an air conditioning for a vehicle compartment, includes an air conditioning case and a case interior member. The air conditioning case defines a warm air passage, a cool air passage, and a downstream space therein. The warm air passage allows air to flow therethrough and to be heated in a heater. The cool air passage allows air to flow therethrough while bypassing the heater. The downstream space is defined on a downstream side of the warm air passage and on a downstream side of the cool air passage. The warm air passage and the cool air passage are connected to each other in the downstream space. The case interior member is arranged in the air conditioning case. The cool air passage is in communication with the downstream space in one direction. The case interior member includes a tunnel member and a tunnel exterior guide wall. The tunnel member defines a tunnel channel therein passing through the tunnel member in a direction intersecting with the one direction. The tunnel exterior guide wall is configured to guide an air to flow from the warm air passage to an outside of the tunnel channel in the downstream space. The tunnel member is open to the warm air passage at an upstream end of the tunnel channel, and includes a tunnel guide wall that faces the tunnel channel and that is configured to guide an air flowing through the tunnel channel. In the downstream space, the air from the cool air passage flows outside the tunnel member across the tunnel member from the cool air passage to a side of the tunnel member away from the cool air passage along the one direction, and joins the air flowing from the warm air passage into the outside of the tunnel member. The tunnel exterior guide wall includes an exterior-wall downstream end that is located most downstream in the tunnel exterior guide wall in a first flow direction. The first flow direction is a direction along which the air flows from the warm air passage into the downstream space along the tunnel exterior guide wall. The tunnel guide wall includes a tunnel-wall downstream end in a second flow direction along which the air flows along the tunnel guide wall in the tunnel channel. The tunnel exterior guide wall around the exterior-wall downstream end extends along a first direction. The tunnel guide wall around the tunnel-wall downstream end extends along a second direction. The first direction is closer to a direction, which is opposite to the one direction along which the air flowing from the cool air passage into the downstream space, as compared to the second direction.

According to the above-described configuration, the air flows through the tunnel channel smoothly. As such, a pressure loss caused by the case interior member as a grid can be prevented from increasing. At the same time, the air, which is guided by the tunnel exterior guide wall to flow to the outside of the tunnel member in the downstream space, is allowed to join the air from the cool air passage while the flow direction of the air flowing into the outside of the tunnel member is closer to an opposite direction, which is opposite to the flow direction of the air flowing from the cool air passage, as compared to the flow direction of the air flowing through the tunnel channel. Therefore, mixing the air guided by the tunnel exterior guide wall with the air from the cool air passage can be promoted. As a result, the temperature variation of the air discharged from the air conditioning unit for a vehicle can be reduced.

DESCRIPTION OF EMBODIMENTS

Figure 1:
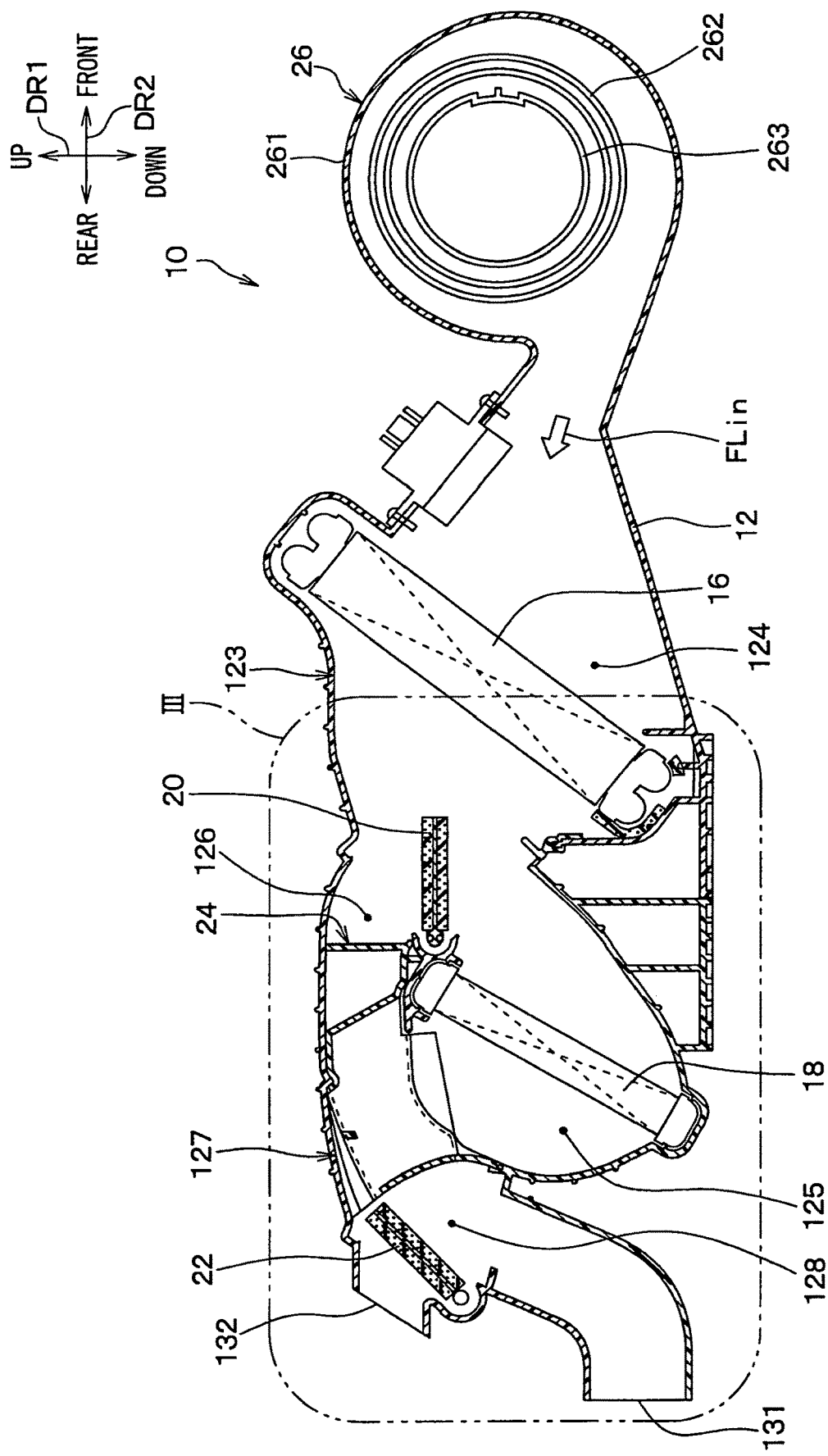
FIG. 1 is a cross-sectional view illustrating a schematic configuration of an air conditioning unit for a vehicle according to a first embodiment.

Hereinafter, embodiments of the present disclosure will be described with reference to the drawings. In the following embodiments, the same or equivalent parts are denoted by the same reference numerals as each other, and explanations will be provided to the same reference numerals.

First Embodiment

Figure 9:
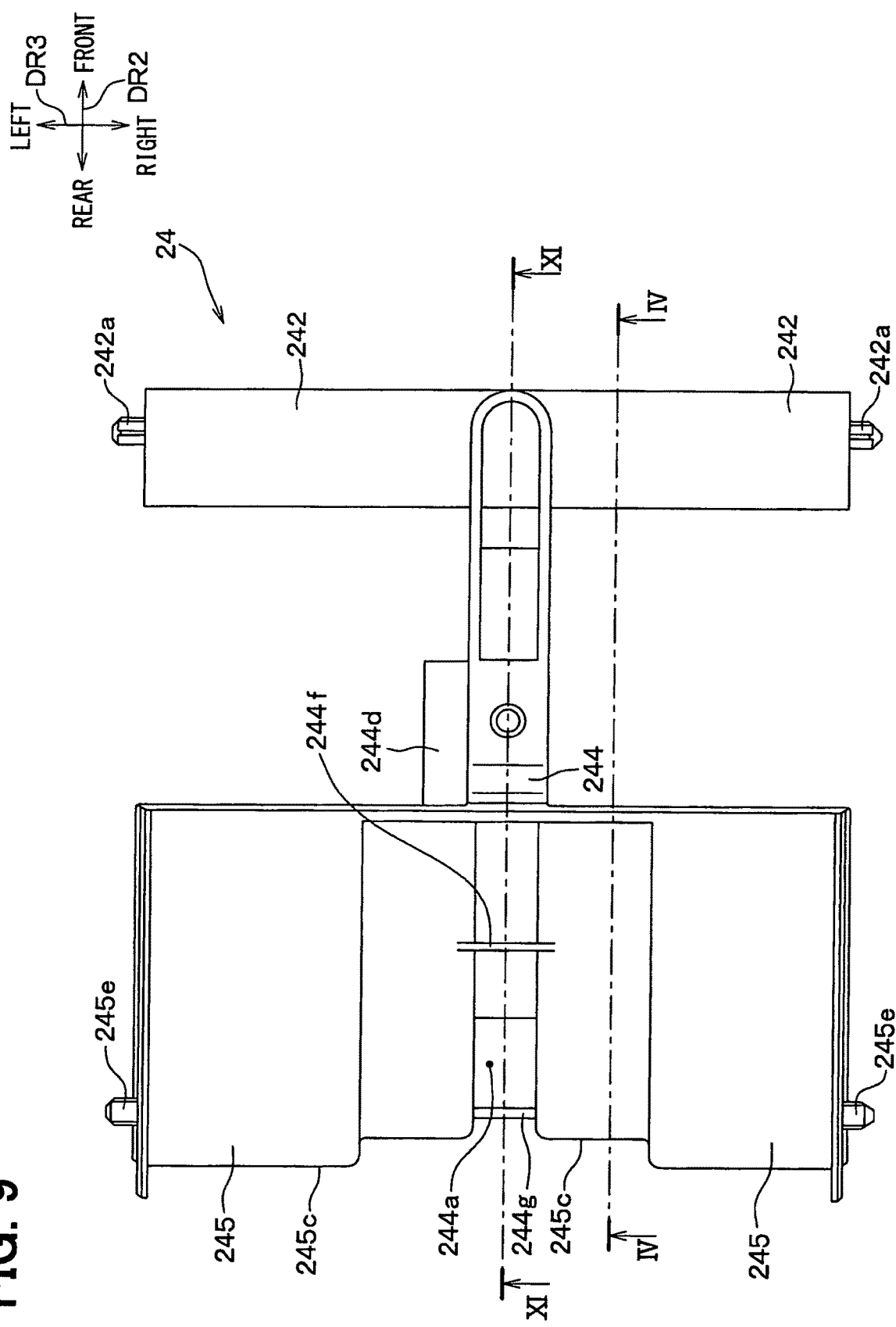
FIG. 9 is a diagram of the grid viewed along an orientation indicator IX shown in FIG. 8, i.e., is a plan view of the grid.

FIG. 1 is a cross-sectional view illustrating a schematic configuration of an air conditioning unit 10 for a vehicle according to the present embodiment. Specifically, FIG. 1 is taken along a line I-I shown in FIG. 2, which is a plan view of the air conditioning unit 10. In other words, FIG. 1 is a cross-sectional view taken at a center of a tunnel channel 244a defined in a grid 24 described later/ The cross-sectional view taken along the line I-I shown in FIG. 2 corresponds to a cross-sectional view taken along a line XI-XI shown in FIG. 9. FIG. 9 is a diagram illustrating the grid 24. In addition, the cross-sectional view taken along the line IV-IV shown in FIG. 2 corresponds to a cross-sectional view taken along the line IV-IV shown in FIG. 9.

Figure 2:
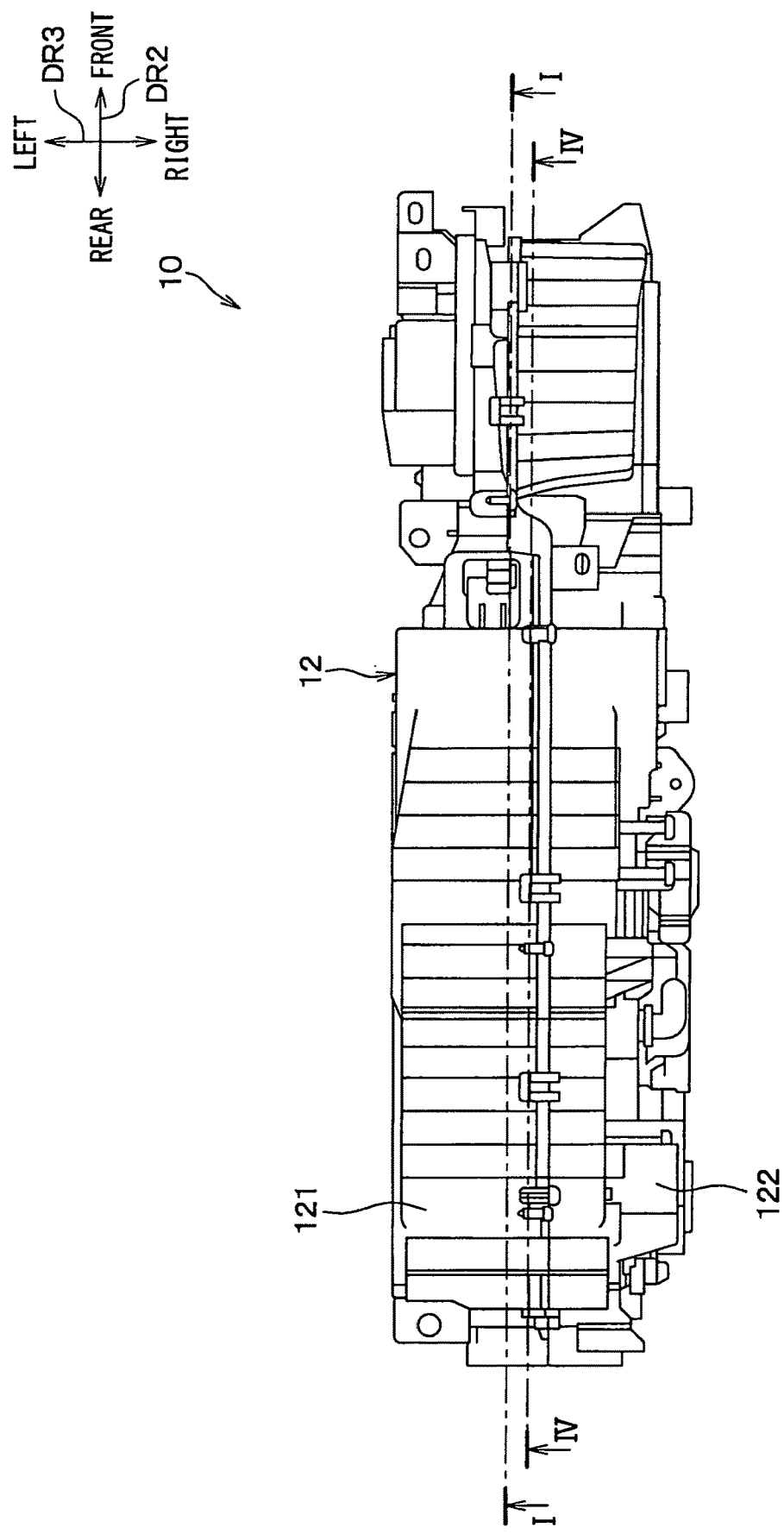
FIG. 2 is a plan view of the air conditioning unit for a vehicle when viewed from an upper side, according to the first embodiment.

For ease of description, orientation indicator DR1, DR2, or DR3 showing the up-down direction, the front-rear direction, and the left-right direction are provided in FIG. 1 and FIG. 2 with the air conditioning unit 10 mounted to the vehicle. That is, the orientation indicator DR1 shows an up-down direction DR1 of the vehicle, and the orientation indicator DR2 shows a front-rear direction DR2 of the vehicle, in FIG. 1. In FIG. 2, the orientation indicator DR3 shows a width direction DR3 of the vehicle. The width direction DR3 is, i.e., a left-right direction DR3 of the vehicle. The up-down direction DR1, the front-rear direction DR2, and the vehicle width direction DR3 intersect with each other, more specifically, are perpendicular to each other.

The air conditioning unit 10 for a vehicle shown in FIG. 1 configures a part of an air conditioner for a vehicle including a compressor and a condenser located outside a vehicle compartment in the vehicle. The air conditioning unit 10 is arranged inside an interior panel of the vehicle compartment and is configured to perform an air conditioning for the vehicle compartment. More specifically, the air conditioning unit 10 serves as an air conditioning unit for a rear seat and is configured to perform air conditioning for a passenger having a rear seat located on a rear side of a front seat including the driver's seat and the passenger's seat.

As shown in FIG. 1, the air conditioning unit 10 for a vehicle includes an air conditioning case 12, an evaporator 16, a heater core 18, an air mix door 20, an outlet door 22, the grid 24, and a blower 26.

The blower 26 is a centrifugal blower. Specifically, the blower 26 is connected to an upstream end of the air conditioning case 12 and is configured to discharge air into the air conditioning case 12. The blower 26 includes a blower case 261, a centrifugal fan 262 in the blower case 261, and a fan motor 263. The blower case 261 is coupled with the air conditioning case 12. The centrifugal fan 262 draws air and discharges the air when being rotated. The fan motor 263 rotates the centrifugal fan 262. When the centrifugal fan 262 rotates, the blower 26 discharges the air toward the evaporator 16 housed in the air conditioning case 12 as shown by an orientation indicator FLin.

As shown in FIG. 1 and FIG. 2, the air conditioning case 12, together with the blower case 261, configures a housing of the air conditioning unit 10. The air conditioning case 12 is formed by two resin members 121, 122. One of the two members 121, 122 is a first case member 121, and the other of the two members 121, 122 is a second case member 122.

The first case member 121 and the second case member 122 are coupled to with each other to form the air conditioning case 12.

The air conditioning case 12 defines, as an air passage, a case passage 123 therein. The case passage 123 allows the air to flow therein toward the vehicle compartment. The case passage 123 is subdivided by a structure provided in the air conditioning case 12. That is, the case passage 123 is divided into an upstream air passage 124, a warm air passage 125, a cool air passage 126, a downstream space 127 as a first space, and a door arrangement space 128 as a second space.

The upstream air passage 124 includes an upstream end connected to an outlet of the blower 26 and a downstream end connected to the warm air passage 125 and the cool air passage 126. That is, the warm air passage 125 and the cool air passage 126 each are connected to the downstream end of the upstream air passage 124 and are in parallel to each other. As such, the cool air passage 126 serves as a bypass passage that allows the air from the upstream air passage 124 to flow therethrough while bypassing the warm air passage 125. In the present embodiment, the cool air passage 126 is located above the warm air passage 125.

The evaporator 16, together with a compressor, a condenser, and an expansion valve (not shown), configures a well-known refrigeration cycle device configured to circulate the refrigerant. The evaporator 16 is configured to cool air passing therethrough by evaporating the refrigerant.

The evaporator 16 is positioned in the upstream air passage 124. That is, the evaporator 16 is a cooling heat exchanger, i.e., a cooler, which is configured to cool the air flowing through the upstream air passage 124. Accordingly, the evaporator 16 cools the air, which flows into the upstream air passage 124 from the blower 26 as indicated by the orientation indicator FLin, and allows the cooled air to at least one of the warm air passage 125 and the cool air passage 126. For example, the evaporator 16 is arranged in the upstream air passage 124 so that all of the air flowing through the upstream air passage 124 passes through the evaporator 16.

The structure of the evaporator 16 is the same as the well-known evaporator used for an air conditioner for a vehicle. Specifically, the evaporator 16 includes a core and a pair of header tanks. The core includes refrigerant tubes and corrugated fins that are stacked alternately. The pair of header tanks connected to both ends of the core portion, respectively.

The heater core 18 is arranged in the warm air passage 125. The heater core 18 is a heating heat exchanger, i.e., a heater, configured to heat the air, which flows out of the evaporator 16 and flows through the warm air passage 125, with engine cooling water. The engine cooling water may be warm water. For example, the heater core 18 is arranged in the warm air passage 125 so that all of the air flowing through the warm air passage 125 passes through the heater core 18.

As such, the air heated by the heater core 18 flows through the warm air passage 125. On the other hand, the cool air, i.e., a cooled air cooled in the evaporator 16, flows through the cool air passage 126 while bypassing the heater core 18.

The structure of the heater core 18 is the same as that of a well-known heating heat exchanger mounted to an air conditioner for a vehicle. Specifically, the heater core 18 includes a core and a pair of header tanks. The core includes warm-water tubes and corrugated fins that are stacked alternately. The pair of header tanks connected to both ends of the core portion, respectively.

Figure 3:
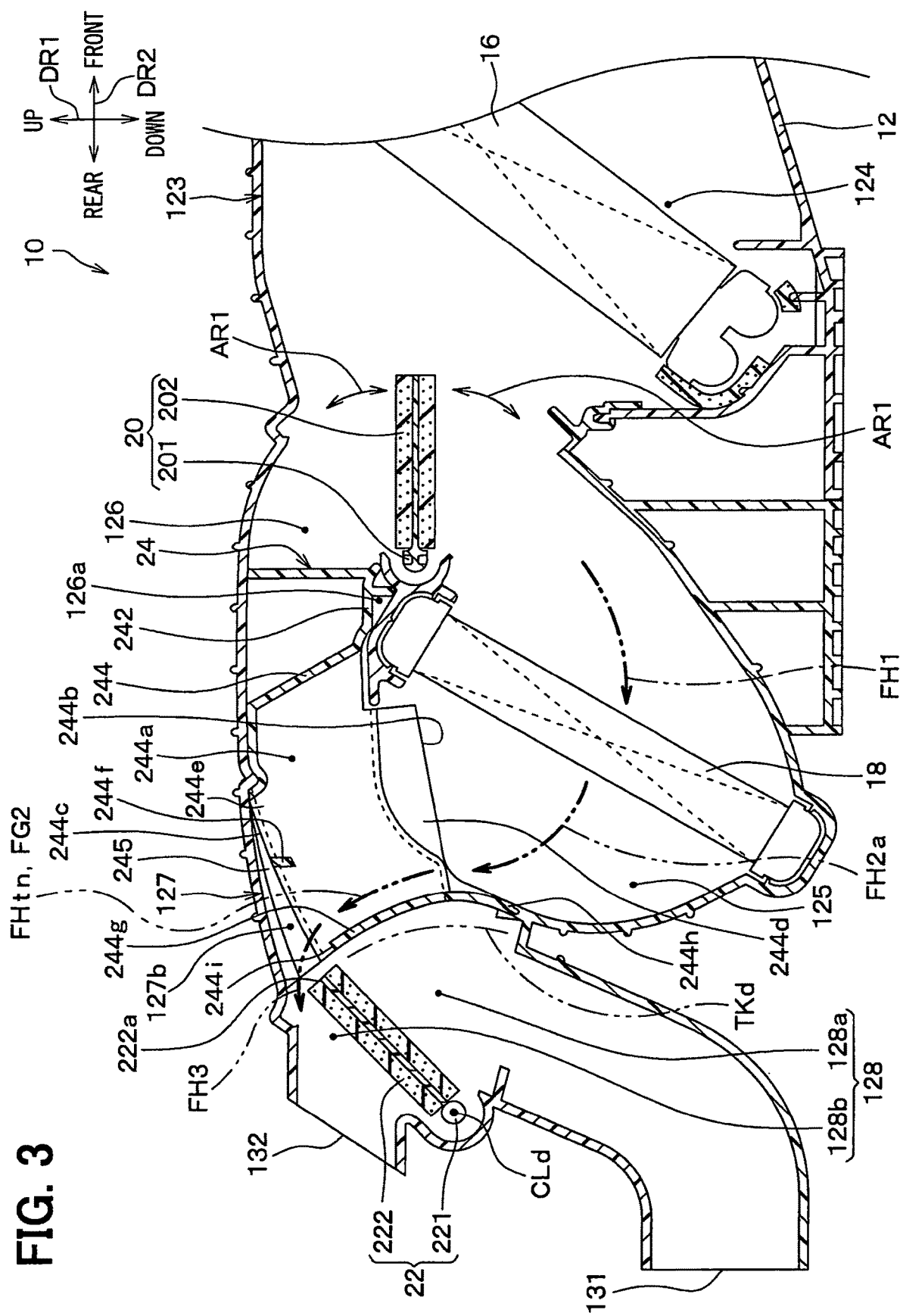
FIG. 3 is an enlarged view of a portion III shown in FIG. 1.

The air mix door 20 is a pivot door arranged in the air conditioning case 12. Specifically, the air mix door 20 is a passage door that opens and closes the warm air passage 125 and the cool air passage 126, and is operated by an electric actuator (not shown). As shown in FIG. 1 and FIG. 3, the air mix door 20 includes a rotary shaft 201 and a door body 202. The rotary shaft 201 extends such that a longitudinal direction thereof is parallel to the vehicle width direction DR3. The door body 202 is a flat plate in shape and is coupled with the rotary shaft 201. The air mix door 20 rotates about the rotary shaft 201 as shown by orientation indicator AR1 so that the door body 202 opens and closes the warm air passage 125 and/or the cool air passage 126 on upstream sides of the warm air passage 125 and the cool air passage 126.

The door body 202 of the air mix door 20 includes a resin plate, which is a flat plate in shape, and a pair of gaskets made of a material such as foamed urethane. The door body 202 has a structure in which the pair of gaskets are attached to both surfaces of the resin plate respectively.

The air mix door 20, which is configured to rotate as shown by orientation indicator AR1, adjusts an air volume ratio between the air flowing through the warm air passage 125 and the air flowing through the cool air passage 126 according to its rotational position. Specifically, the air mix door 20 is configured to move between a maximum cooling position and a maximum heating position consecutively. The air mix door 20 at the maximum cooling position fully closes the warm air passage 125 and fully opens the cool air passage 126. The air mix door 20 at the maximum heating position fully opens the warm air passage 125 and fully closes the cool air passage 126. FIG. 3 shows the air mix door 20 at an intermediate position between the maximum cooling position and the maximum heating position. The air mix door 20 at the intermediate position opens both of the warm air passage 125 and the cool air passage 126.

The maximum cooling position of the air mix door 20 may be referred to as a MAXCOOL position. When the air mix door 20 is at the maximum cooling position, the entire amount of the air after passing through the evaporator 16 flows to the cool air passage 126. That is, the air mix door 20 is positioned at the maximum cooling position during a maximum cooling operation, i.e., a MAXCOOL operation, in which the air conditioning unit 10 for a vehicle performs a cooling operation with the highest efficiency.

The maximum heating position of the air mix door 20 may be referred to as a MAXHOT position. When the air mix door 20 is at the maximum heating position, the entire amount of the air after passing through the evaporator 16 flows to the warm air passage 125. That is, the air mix door 20 is positioned at the maximum heating position during a maximum heating operation, i.e., a MAXHOT operation, in which the air conditioning unit 10 for a vehicle performs a heating operation with the highest efficiency.

The air mix door 20 is configured to be located at the intermediate position between the maximum cooling position and the maximum heating position. When the air mix door 20 is at the intermediate position, the air after passing through the evaporator 16 flows to both of the warm air passage 125 and the cool air passage 126 with a ratio corresponding to the position of the air mix door 20. The warm air, which is heated in the heater core 18 while passing through the warm air passage 125, and the cool air after passing through the cool air passage 126 are mixed with each other in an air mixing space, and then flow into the vehicle compartment. Specifically, the downstream space 127 and the door arrangement space 128 serve as the air mixing space. As such, a temperature of the air, which flows from the blower 26 as shown by orientation indicator FLin, is adjusted according to the position of the air mix door 20, and then the air is discharged into the vehicle compartment as the conditioned air.

Figure 4:
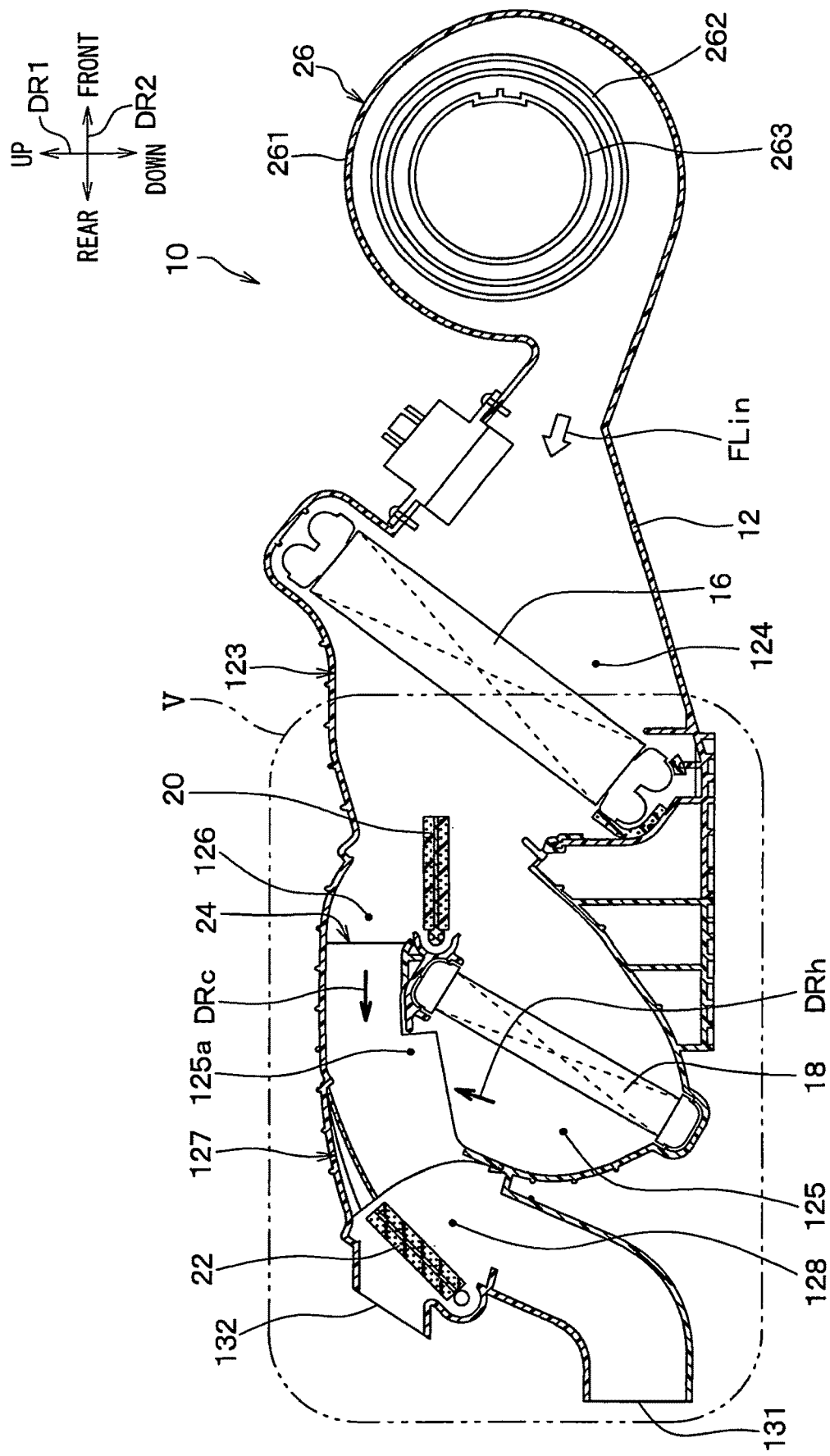
FIG. 4 is a cross-sectional view taken along a line IV-IV shown in FIG. 2, i.e., a cross-sectional view taken at a position outside a tunnel member of a grid.

The downstream space 127 is defined downstream of the warm air passage 125 and downstream of the cool air passage 126 in the flow direction of the air. The downstream space 127 is connected with each of the warm air passage 125 and the cool air passage 126. For example, the warm air passage 125 includes a connection end 125a where the warm air passage 125 is connected to the downstream space 127 as shown in FIG. 4.

The cool air passage 126 is in communication with the downstream space 127 in one direction DRc, i.e., a cool-air-passage connection direction DRc. The warm air passage 125 is in communication with the downstream space 127 in an other direction DRh, i.e., a warm-air-passage connection direction DRh, intersecting with the cool-air passage connection direction DRc.

The outlet door 22 is arranged in the door arrangement space 128. The door arrangement space 128 is connected to the downstream space 127. Specifically, the door arrangement space 128 is defined downstream of the downstream space 127 in the flow direction of the air flowing through the case passage 123. That is, the door arrangement space 128 is connected to the downstream space 127 on a side of the downstream space 127 away from the cool air passage 126. As such, the air flowing out of the downstream space 127 is discharged into the vehicle compartment via the door arrangement space 128.

Figure 5:
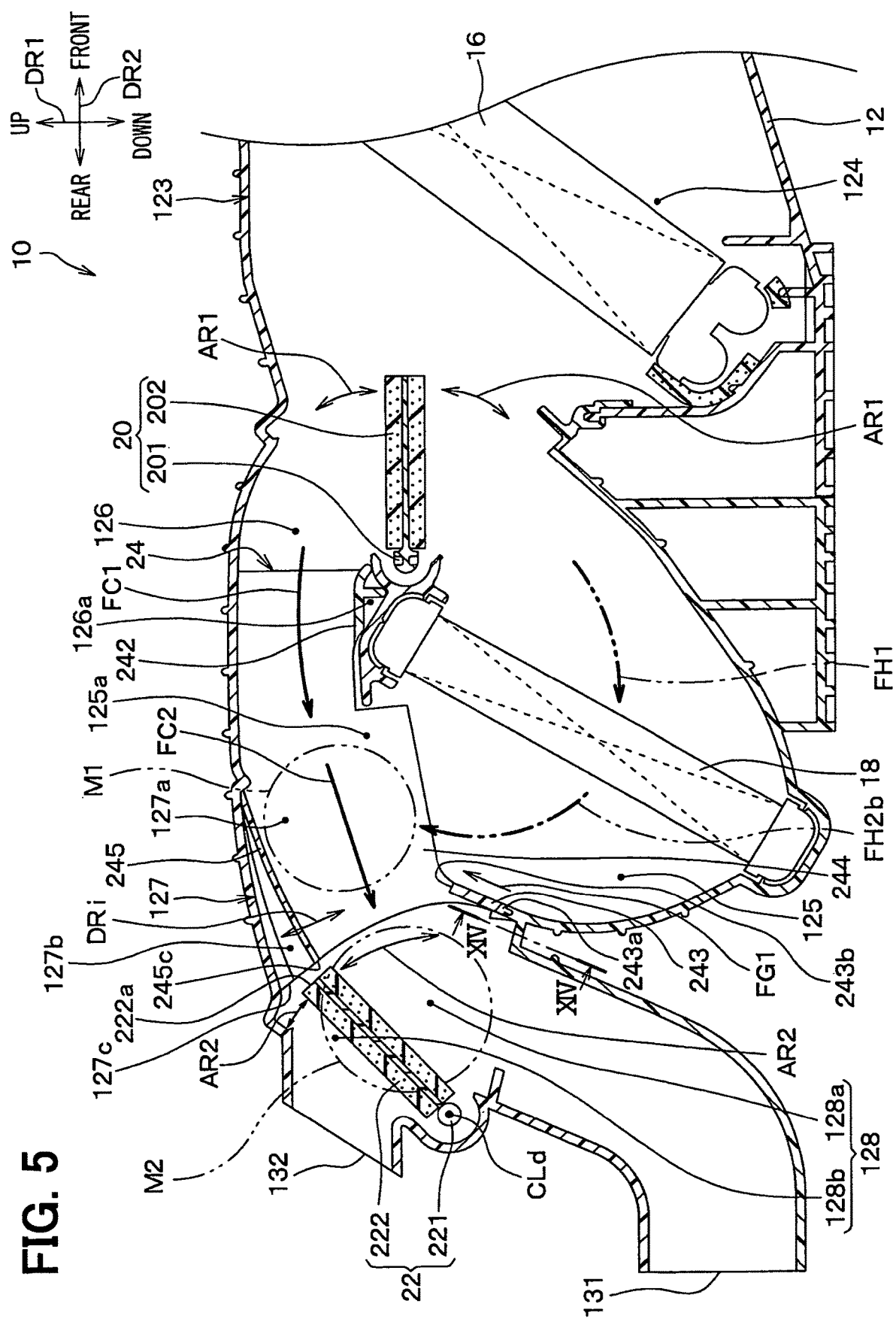
FIG. 5 is an enlarged view of a portion V shown in FIG. 4.

As shown in FIG. 3 and FIG. 5, the air conditioning case 12 is provided with a plurality of air outlets 131, 132 that are configured to discharge air (i.e., the conditioned air), a temperature of which is adjusted, into the vehicle compartment. The air outlets 131, 132 each are connected to the door arrangement space 128 so that the conditioned air after passing through the door arrangement space 128 is discharged into the vehicle compartment via at least one of the air outlets 131, 132.

For example, the air outlets 131, 132 may be a foot outlet 131 as a first air outlet and a face outlet 132 as a second air outlet. The foot outlet 131 discharges the conditioned air toward feet of an occupant having a rear seat. The face outlet 132 discharges the conditioned air toward an upper body of the occupant having the rear seat.

The face outlet 132 is positioned above the foot outlet 131 in the air conditioning case 12. As such, a junction where the face outlet 132 is connected to the door arrangement space 128 is located above a junction where the foot outlet 131 is connected to the door arrangement space 128.

The face outlet 132 is connected to the door arrangement space 128 on a side of the door arrangement space 128 away from the downstream space 127 in the cool-air-passage connection direction DRc shown in FIG. 4. Accordingly, the cool air passage 126, the downstream space 127, the door arrangement space 128, and the face outlet 132 are arranged in this order along the cool-air-passage connection direction DRc. That is, the structure inside the air conditioning case 12 has a layout in which the cool air, i.e., air flowing through the cool air passage 126, flows from the cool air passage 126 to the face outlet 132 linearly.

The outlet door 22 is a second space door positioned in the door arrangement space 128, i.e., the second space. The outlet door 22 rotates inside the door arrangement space 128. For example, the outlet door 22 may be a pivot door having a similar configuration to the air mix door 20 and may be operated by an electric actuator (not shown). The outlet door 22 is positioned upstream of the foot outlet 131 and the face outlet 132 in the flow direction of air.

The outlet door 22 includes a rotary shaft 221 and a door body 222. The rotary shaft 221 has a longitudinal axis CLd parallel to the vehicle width direction DR3. The door body 222 is a plate in shape and is connected to the rotary shaft 221. The door body 222 is configured to rotate about the longitudinal axis CLd as shown by orientation indicator AR2. The door body 222 may be referred to as a door member as well. The outlet door 22 with the door body 222 rotated opens and closes the foot outlet 131 and the face outlet 132.

For example, the door body 222 of the outlet door 22 may have the similar configuration to the door body 202 of the air mix door 20. The door body 222 of the outlet door 22 includes a resin plate, which is a flat plate in shape, and a pair of gaskets made of a material such as foamed urethane. The door body 222 has a structure in which the pair of gaskets is attached to both surfaces of the resin plate respectively.

Further, the outlet door 22 is a cantilever door mechanism in which a base edge of the door body 222 is connected to the rotary shaft 201. The door body 222 of the outlet door 22 includes a door edge 222a positioned between the longitudinal axis CLd and the downstream space 127. In the present embodiment, the door edge 222a of the door body 222 is positioned between the longitudinal axis CLd and the downstream space 127, regardless of a rotational position of the outlet door 22 within an operation range between a foot mode position and a face mode position described later.

The rotational position of the outlet door 22 is set correspondingly to blowing modes that are performed by the air conditioning unit 10 for a vehicle selectively. For example, the blowing modes of the air conditioning unit 10 for a vehicle include the foot mode, the face mode, and the bi-level mode.

In the foot mode, the conditioned air is discharged from the foot outlet 131 mainly. In the face mode, the conditioned air is discharged from the face outlet 132 mainly. In the bi-level mode, the conditioned air is discharged from both of the foot outlet 131 and the face outlet 132.

For example, when the air conditioning unit 10 for a vehicle is operated in the foot mode, the outlet door 22 is at the foot mode position to close the face outlet 132 and to fully open the foot outlet 131.

When the air conditioning unit 10 for a vehicle is operated in the face mode, the outlet door 22 is at the face mode position to fully open the face outlet 132 and to close the foot outlet 131.

When the air conditioning unit 10 for a vehicle is operated in the bi-level mode, the outlet door 22 is at an intermediate position between the face mode position and the foot mode position. FIG. 1, FIG. 3, FIG. 4 and FIG. 5 shows the outlet door 22 at the bi-level mode.

As described above, the air conditioning case 12 is configured to discharge the conditioned air that is provided by mixing the warm air from the warm air passage 125 and the cool air form the cool air passage 126. The grid 24 is mounted so as to reduce a temperature difference in the conditioned air in the vehicle up-down direction DR1 and a temperature variation in the conditioned air.

Figure 6:
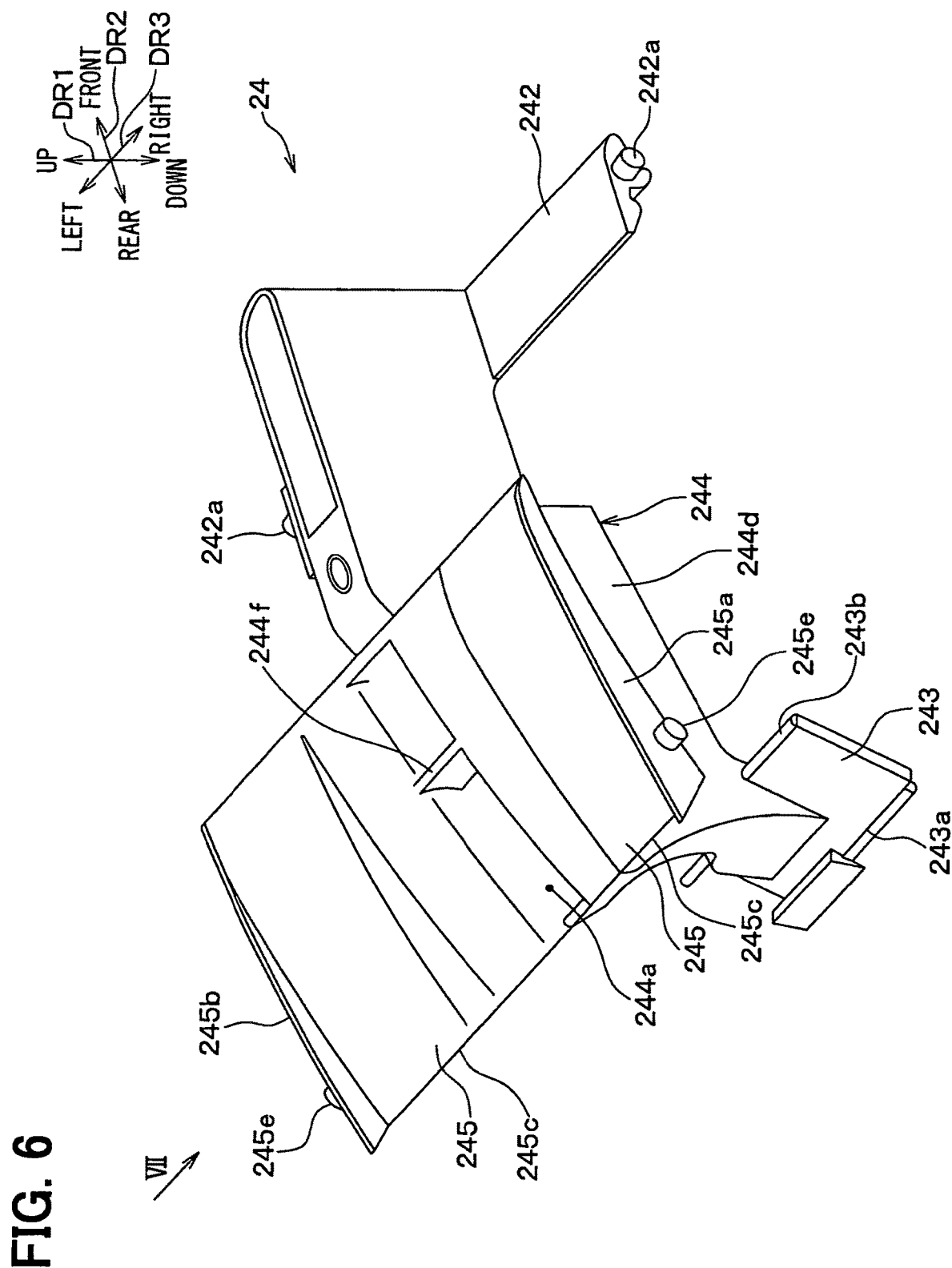
FIG. 6 is a first perspective view of the grid of the air conditioning unit according to the first embodiment.
Figure 7:
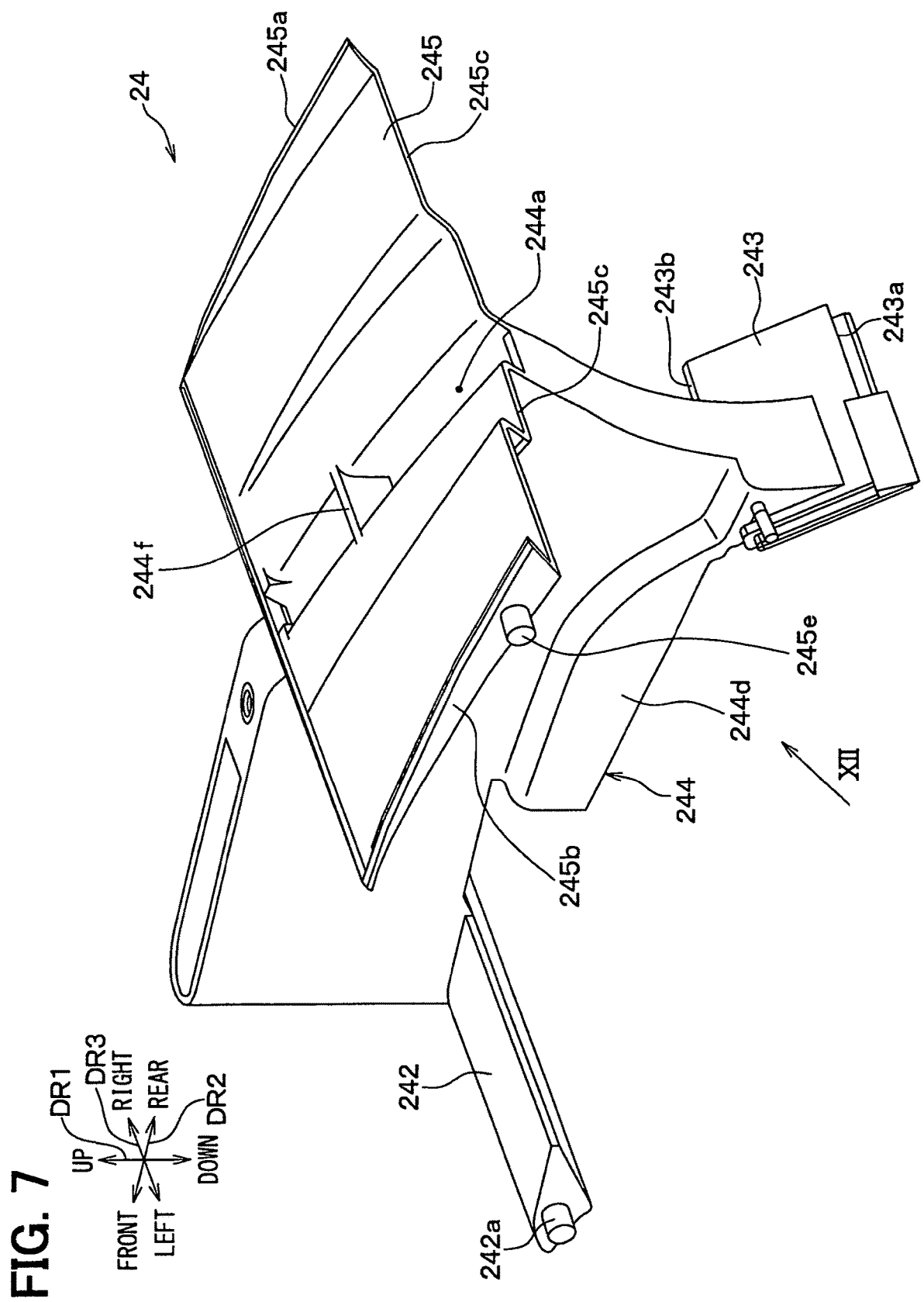
FIG. 7 is a second perspective view of the grid when viewed along an orientation indicator VII shown in FIG. 6.

As shown in FIG. 3 and FIG. 5, the grid 24 in the case passage 123 extends across the cool air passage 126 and the downstream space 127. In other words, the grid 24 is a case interior member that is arranged in the air conditioning case 12. FIG. 6 and FIG. 7 each are a perspective view showing the grid 24 alone.

As shown in FIG. 3, FIG. 6 and FIG. 7, the grid 24 includes a first support portion 242, a tunnel exterior guide wall 243 as a second support portion, a tunnel member 244 as a warm air tunnel, and a blade 245. The first support portion 242, the tunnel exterior guide wall 243, the tunnel member 244, and the blade 245 are formed integrally with each other. For example, the grid 24 may be made of resin. In this case, the first support portion 242, the tunnel exterior guide wall 243, the tunnel member 244, and the blade 245 are molded all together.

The first support portion 242 is coupled to the tunnel member 244 on an upstream of the tunnel member 244 along the flow direction of the air flowing through the case passage 123. The first support portion 242 fixes the tunnel member 244 to the air conditioning case 12. The first support portion 242 is arranged inside a recessed portion 126a defined in a part of the cool air passage 126.

The first support portion 242 includes a pair of bosses 242a on both sides of the first support portion 242 in the vehicle width direction DR3. The pair of bosses 242a each protrude from the first support portion 242 along the vehicle width direction DR3. The first support portion 242 is fixed to the air conditioning case 12 by inserting the bosses 242a into fitting holes (not shown) defined in the air conditioning case 12.

The blade 245 includes a pair of bosses 245e as well similar to the first support portion 242 with the bosses 242a. The blade 245 is fixed to the air conditioning case 12 by inserting the bosses 245e into fitting holes (not shown) defined in the air conditioning case 12.

As shown in FIG. 5, FIG. 6 and FIG. 7, the tunnel exterior guide wall 243 is coupled with a lower portion of the tunnel member 244 and fixes the tunnel member 244 to the air conditioning case 12.

The tunnel exterior guide wall 243 is a plate in shape and defines a part of the connection end 125a of the warm air passage 125 that is furthermost from the cool air passage 126 in the cool-air-passage connection direction DRc shown in FIG. 4. As such, the tunnel exterior guide wall 243 guides the air that flows from the warm air passage 125 into the downstream space 127, specifically into the outside of the tunnel member 244 in the downstream space 127. That is, the tunnel exterior guide wall 243 guides the air to flow from the warm air passage 125 into a first divided space 127a, which is a part of the downstream space 127, as shown by orientation indicator FH2b. The first divided space 127a will be described in detail later. The tunnel exterior guide wall 243 includes one surface and an other surface facing each other in a thickness direction of the tunnel exterior guide wall 243. Specifically, the one surface faces one direction of the thickness direction and faces the door arrangement space 128, and the other surface faces the other direction of the thickness direction and faces the warm air passage 125.

As described above, the tunnel exterior guide wall 243 guides the air flowing into the first divided space 127a. As such, the air flows from the warm air passage 125 into the downstream space 127 along the tunnel exterior guide wall 243 in a flow direction FG1. The flow direction FG1 will be referred to as a first flow direction FG1.

The tunnel exterior guide wall 243 includes an exterior-wall upstream end 243a in the first flow direction FG1 and an exterior-wall downstream end 243b in the first flow direction FG1.

As shown in FIG. 3, FIG. 6 and FIG. 7, the tunnel member 244 of the grid 24 defines a tunnel channel 244a therein passing through the tunnel member 244 along a direction intersecting with the cool-air-passage connecting direction DRc shown in FIG. 4. The tunnel channel 244a includes an upstream end 244b and a downstream end 244c, and allows the warm air from the warm air passage 125 to flow from the upstream end 244b to the downstream end 244c as shown by orientation indicator FHtn.

As shown in FIG. 3 and FIGS. 6 to 11, the tunnel member 244 includes an upstream-end forming portion 244d and a downstream-end forming portion 244e. The upstream-end forming portion 244d defines the upstream end 244b of the tunnel channel 244a. The downstream-end forming portion 244e defines the downstream end 244c of the tunnel channel 244a.

The upstream-end forming portion 244d is open downward along the vehicle up-down direction DR1. As such, the tunnel member 244 is open to the warm air passage 125 at the upstream end 244b of the tunnel channel 244a. That is, the upstream-end forming portion 244d is open to the warm air passage 125.

The downstream-end forming portion 244e is open away from the upstream-end forming portion 244d. For example, the downstream-end forming portion 244e may be open substantially upward.

More specifically, the downstream-end forming portion 244e in the downstream space 127 is located away from a warm-air-passage junction where the downstream space 127 is connected to the warm air passage 125. For example, since the warm-air-passage junction is located in a lower area inside the downstream space 127, the downstream-end forming portion 244e is located in an upper area inside the downstream space 127.

The tunnel member 244 includes a rib 244f therein. The rib 244f is positioned in the tunnel channel 244a. The rib 244f in the tunnel channel 244a is positioned adjacent to the downstream end 244 of the tunnel channel 244a. For example, as shown in FIG. 3, the rib 244f extends along a flow direction of air flowing through the tunnel channel 244a.

Further, as shown in FIG. 3 and FIGS. 6 to 13, the tunnel member 244, in a cross section, has a flat shape extending longitudinally along the cool-air-passage connection direction DRc shown in FIG. 4. In addition, a thickness direction DRt of the tunnel member 244 coincides with the vehicle width direction DR3. The upstream-end forming portion 244d of the tunnel member 244 is inserted into a downstream end portion of the warm air passage 125 from the downstream space 127.

Specifically, as shown in FIG. 3, FIG. 5, FIG. 12 and FIG. 13, a width of the tunnel channel 244a is increased in the thickness direction DRt in the upstream end 244b of the tunnel channel 244a. That is, the upstream end forming portion 244d of the tunnel member 244 forms the upstream end 244b so that the width of the upstream end 244b in the thickness direction DRt is greater than a width of an intermediate portion of the tunnel channel 244a in the thickness direction DRt.

The upstream end forming portion 244d extends into the warm air passage 125 as described above. As such, the upstream end forming portion 244d is located outside of an area through which a main flow of the air (i.e., the cool air), which flows from the cool air passage 126 into the downstream space 127 and passes through the downstream space 127, flows. The main flow of the cool air is a main flow of the cool air flowing from the cool air passage 126 and is shown by orientation indicator FC2 in FIG. 5. Therefore, in the present embodiment, the area through which the main flow of the cool air flows corresponds to an area that is defined by extending an open end of the cool air passage 126, which is open to the downstream space 127, along the flow direction of the main flow shown by orientation indicator FC2.

As shown in FIG. 3 and FIGS. 6 to 11, the tunnel member 244 includes a tunnel guide wall 244g that defines a part of the tunnel channel 244a. The tunnel guide wall 244g forms a part of the tunnel member 244. Specifically, the tunnel guide wall 244g is positioned on a side of the tunnel member 244 away from the cool air passage 126 along the cool-air-passage connection direction DRc shown in FIG. 4. As a result, the tunnel guide wall 244g faces the tunnel channel 244a and guides the air in the tunnel channel 244a to flow as shown by orientation indicator FHtn.

As shown in FIG. 3, the tunnel guide wall 244g has a shape that allows the tunnel guide wall 244g to avoid being in contact with the outlet door 22. Specifically, the door edge 222a moves along a rotational path TKd when the door body 222 of the outlet door 22 rotates, and the tunnel guide wall 244g is spaced from the rotational path TKd in a radial direction perpendicular to the rotational axis CLd. In addition, the tunnel guide wall 244g is curved along the rotational path TKd of the door edge 222a.

Figure 11:
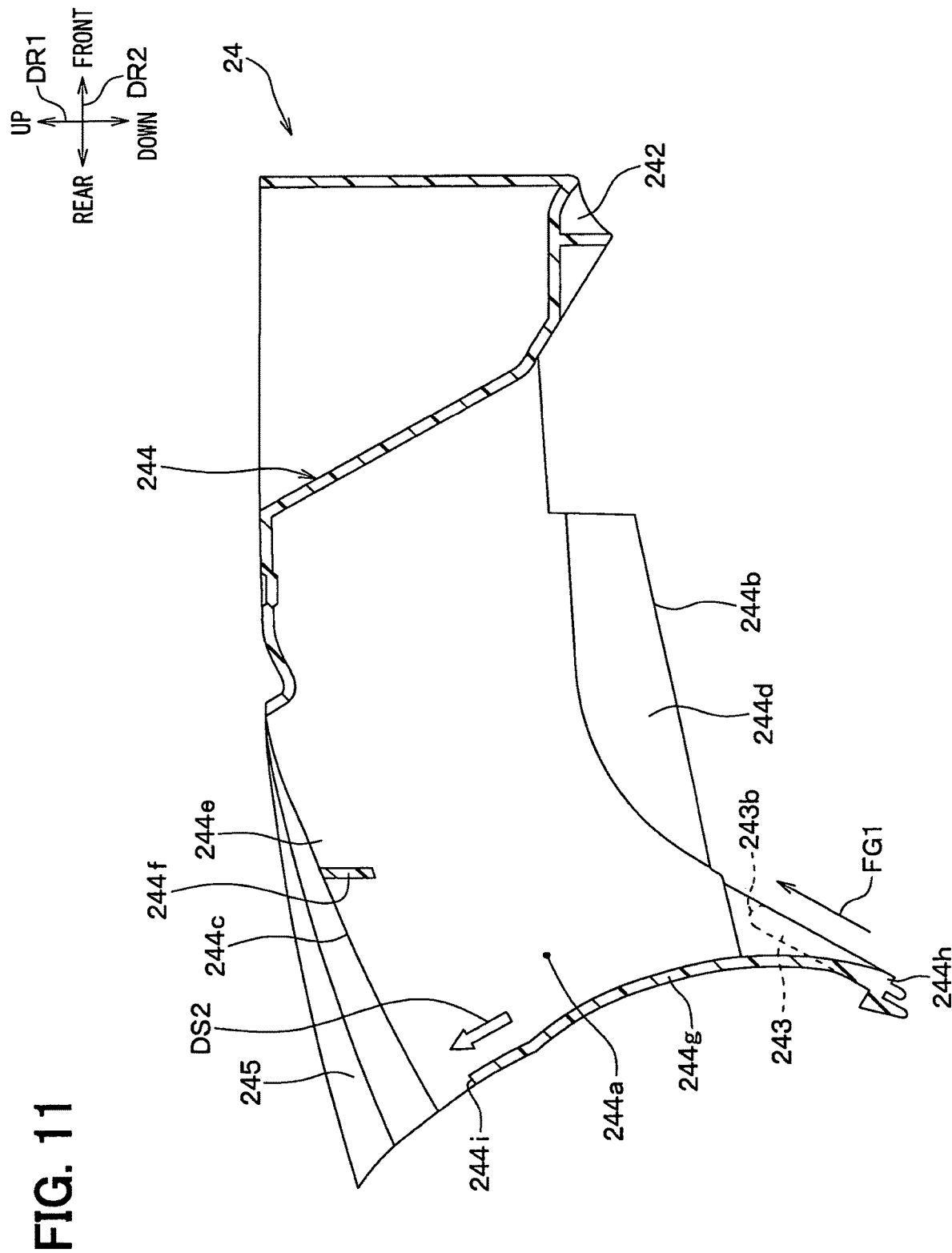
FIG. 11 is a cross-sectional view of the grid taken along a line XI-XI shown in FIG. 9, i.e., a cross-sectional view of the grid taken at a center of a tunnel channel defined in the grid.
Figure 12:
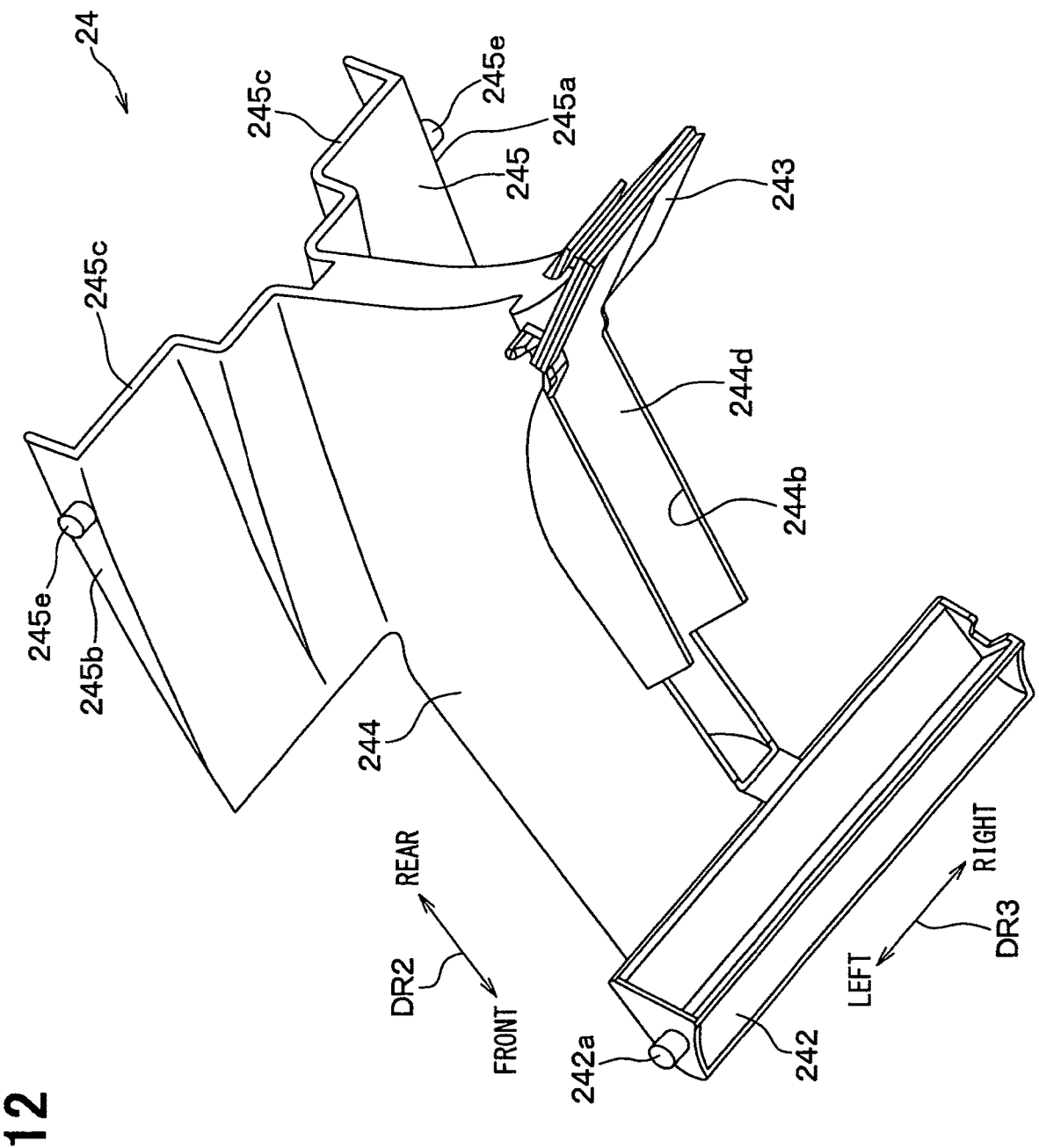
FIG. 12 is a third perspective view of the grid when viewed along an orientation indicator XII shown in FIG. 7.
Figure 13:
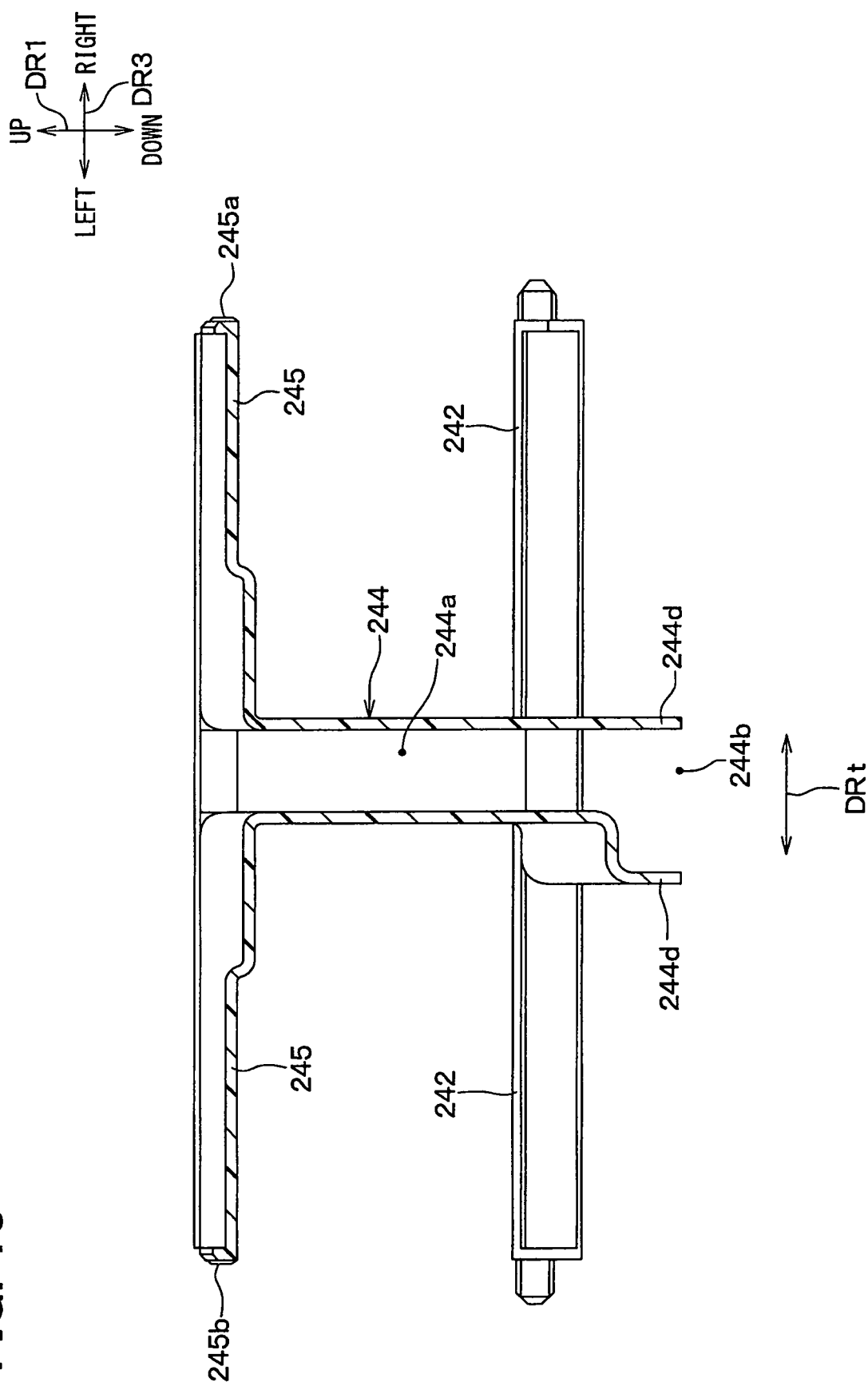
FIG. 13 is a cross-sectional view taken along a line XIII-XIII shown in FIG. 8.

As shown in FIG. 3, FIG. 5, and FIG. 11, the tunnel guide wall 244g includes a tunnel-wall upstream end 244h that is located upstream of an exterior-wall downstream end 243b in the first flow direction FG1. For example, in the present embodiment, the tunnel-wall upstream end 244h coincides with the exterior-wall upstream end 243a in the first flow direction FG1. For explanation purpose, the orientation indicator showing the first flow direction FG1 in FIG. 5 is transcribed into FIG. 11.

Further, the tunnel guide wall 244g guides the air in the gunnel channel 244a so that the air flows through the tunnel channel 244a along the tunnel guide wall 244g in a flow direction FG2 as shown by orientation indicator FHtn. The flow direction FG2 will be referred to as a second flow direction FG2.

The tunnel guide wall 244g includes the tunnel-wall upstream end 244h in the second flow direction FG2 and a tunnel-wall downstream end 244i in the second flow direction FG2.

As shown in FIG. 3, FIG. 6, FIG. 7 and FIG. 11, the blade 245 of the grid has a wing shape. Specifically, the blade 245 expands from the downstream-end forming portion 244e of the tunnel member 244 to both sides of the tunnel member 244 along the vehicle width direction DR3. The vehicle width direction DR3 is a width direction intersecting with both of the cool-air-passage connection direction DRc and the warm-air-passage connection direction DRh shown in FIG. 4.

The tunnel member 244 and the blade 245 of the grid 24 are arranged in the downstream space 127. As shown in FIG. 3, FIG. 6, FIG. 7 and FIG. 10, the tunnel member 244 occupies a part of an entire width of the downstream space 127 along the vehicle width direction DR3. Specifically, the tunnel member 244 is positioned substantially at the center of the downstream space 127 along the vehicle width direction DR3.

On the other hand, the blade 245 extends across the entire width of the downstream space 127 along the vehicle width direction DR3. For example, one end 245a and the other end 245b of the blade 245 in the vehicle width direction DR3 abut on an inner surface of the air conditioning case 12 facing the downstream space 127.

As such, the blade 245 divides the downstream space 127 as shown in FIG. 5. Specifically, the blade 245 divides the downstream space 127 to define two divided spaces 127a, 127b in the downstream space 127.

Here, partitioning the downstream space 127 by the blade 245 is not limited to partitioning the two divided spaces 127a, 127b completely. For example, the blade 245 divides the downstream space 127 roughly such that the two divided spaces 127a, 127b are not separated from each other completely.

Hereafter, one of the two divided spaces 127a, 127b will be referred to as a first divided space 127a. The first divided space 127a is proximate to the warm-air-passage junction where the warm air passage 125 is connected to the downstream space 127. The other of the two divided spaces 127a, 127b will be referred to as a second divided space 127b. That is, a portion of the downstream space 127 excluding the tunnel channel 244a is configured by the first divided space 127a and the second divided space 127b.

The first divided space 127a is positioned below the second divided space 127b with the blade 245 interposed therebetween. The first divided space 127a is open to each of the warm air, passage 125, the cool air passage 126, and the door arrangement space 128. The second divided space 127b is open to both of the tunnel channel 244a defined in the grid 24 and the door arrangement space 128.

Figure 10:
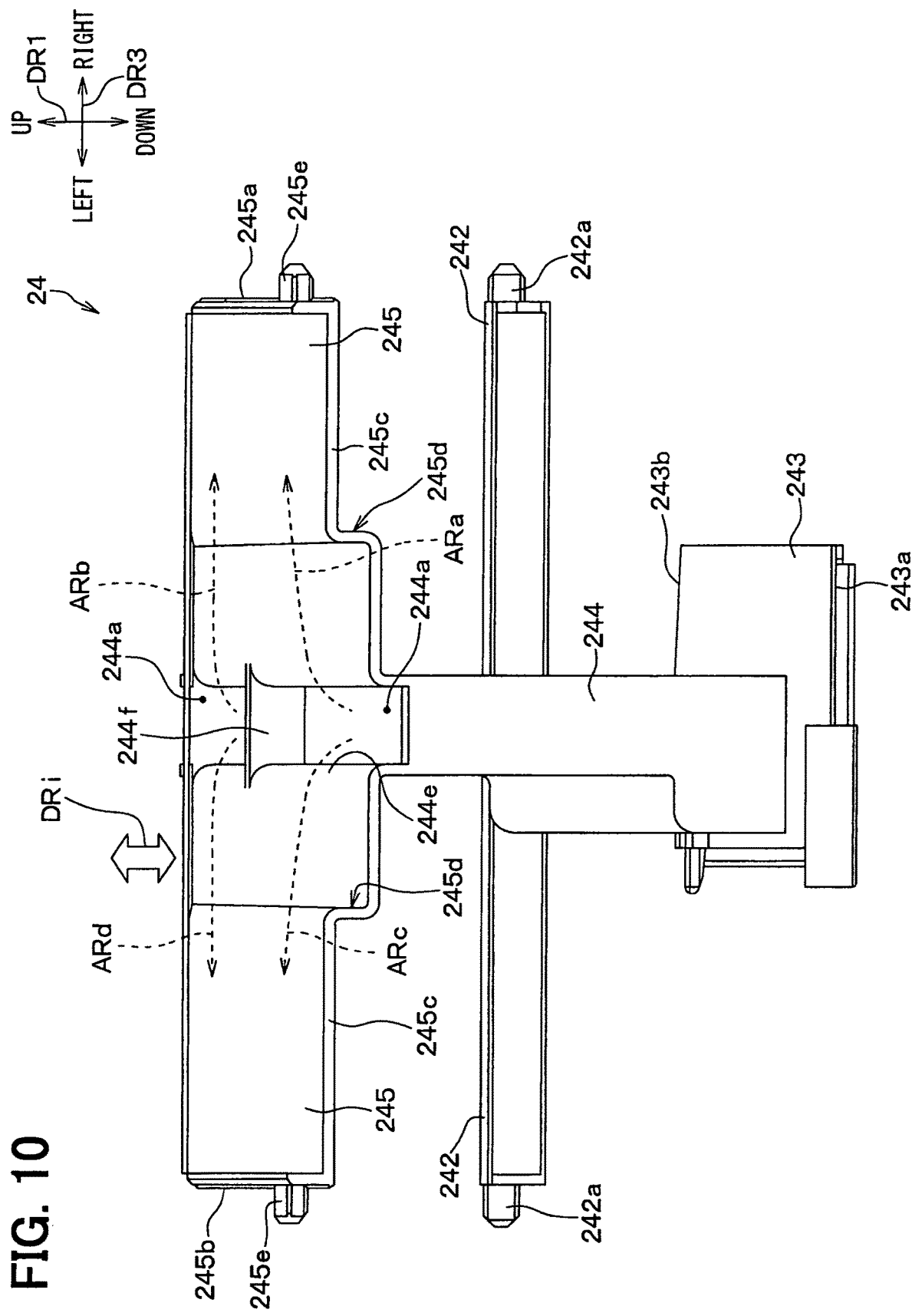
FIG. 10 is a diagram of the grid viewed along an orientation indicator X shown in FIG. 8, i.e., is a plan view of the grid.

As shown in FIG. 5 and FIG. 10, the tunnel member 244 of the grid 24 divides the first divided space 127a along the vehicle width direction DR3. That is, on a lower side of the blade 245 in the downstream space 127, the first divided space 127a corresponds to a total of a space, which is defined on one side of the tunnel member 244 in the vehicle width direction DR3, and a space, which is defined on the other side of the tunnel member 244 in the vehicle width direction DR3.

Further, as shown in FIG. 5, the second divided space 127b is formed in a wedge shape by the blade 245 of the grid 24 and the air conditioning case 12. That is, the second divided space 127b expands toward the door arrangement space 128 in the cool-air-passage connection direction DRc shown in FIG. 4.

The blade 245 of the grid 24 closes the second divided space 127b on a side of the second divided space 127b away from the door arrangement space 128. That is, the blade 245 closes a front end of the second divided space 127b in the vehicle front-rear direction DR2.

On the other hand, the blade 245 opens a rear end of the second divided space 127b in the vehicle front-rear direction DR2. That is, the second divided space 127b includes an open end 127c that is open to the door arrangement space 128.

As shown in FIG. 5 and FIG. 10, the blade 245 of the grid 24 has a stepped shape that forms a step in a space arrangement direction DRi along which the first divided space 127a and the second divided space 127b face each other. With this step shape, the blade 245 defines the second divided space 127b to expand along the space arranging direction DRi toward the downstream-end forming portion 244e of the tunnel member 244 in the vehicle width direction DR3. In short, the width of the second divided space 127b along the space arrangement direction DRi increases toward the center of the blade 245 in the vehicle width direction DR3.

In the second divided space 127b defined as described above, the blade 245 of the grid 24 guides the air, which flows from the downstream end 244c of the tunnel channel 244a, to diffuse along the vehicle width direction DR3 as shown by orientation indicators ARa, ARb, ARc, and ARd in FIG. 10.

As described above, the tunnel exterior guide wall 243 guides the warm air to the first divided space 127a as shown by orientation indicator FH2b in FIG. 5. In addition, the air conditioning case 12 includes a case wall 129. The case wall 129, together with the tunnel exterior guide wall 243, guides the warm air to the first divided space 127a as shown in FIG. 14 and FIG. 15.

Figure 8:
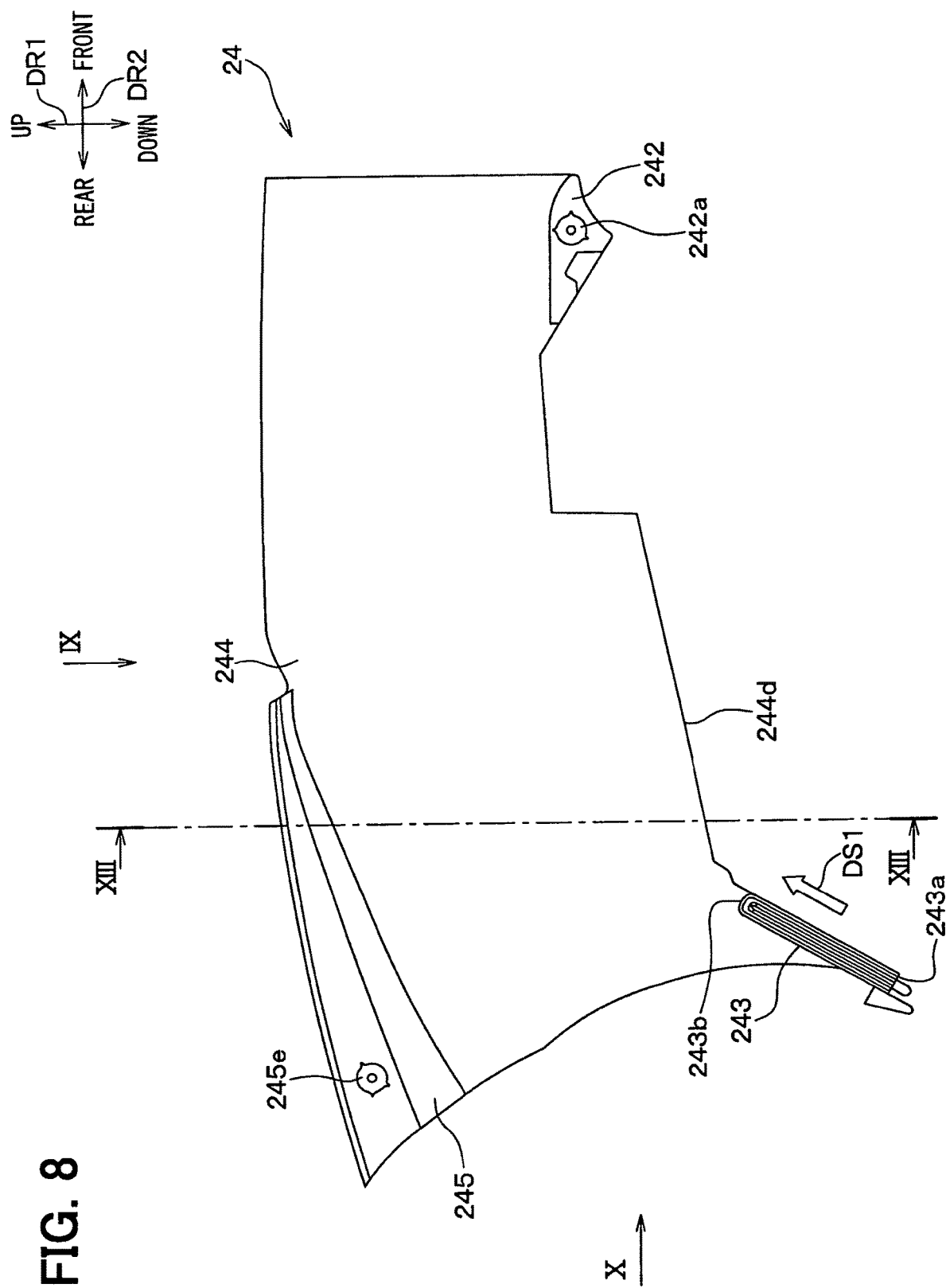
FIG. 8 is a front view of the grid in the same direction as shown in FIG. 1, according to the first embodiment.

That is, a downstream portion of the case wall 129 in the first flow direction FG1 shown in FIG. 5 extends along a first direction DS1 shown in FIG. 8. For example, when projecting the case wall 129 on a virtual plane with a normal direction coinciding with the vehicle width direction DR3, the case wall 129 extends parallel to the tunnel exterior guide wall 243.

Figure 14:
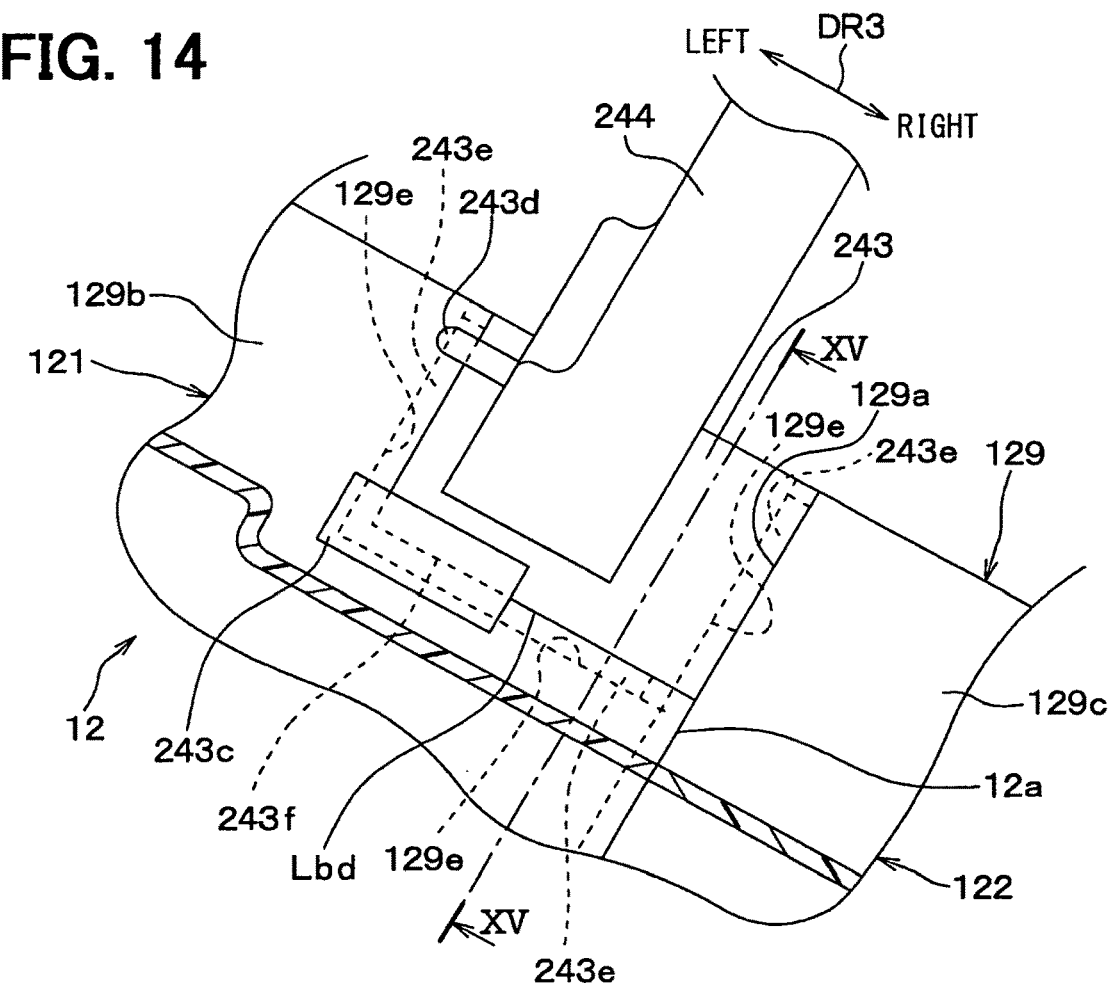
FIG. 14 is a cross-sectional view taken along a line XIV-XIV shown in FIG. 5.
Figure 15:
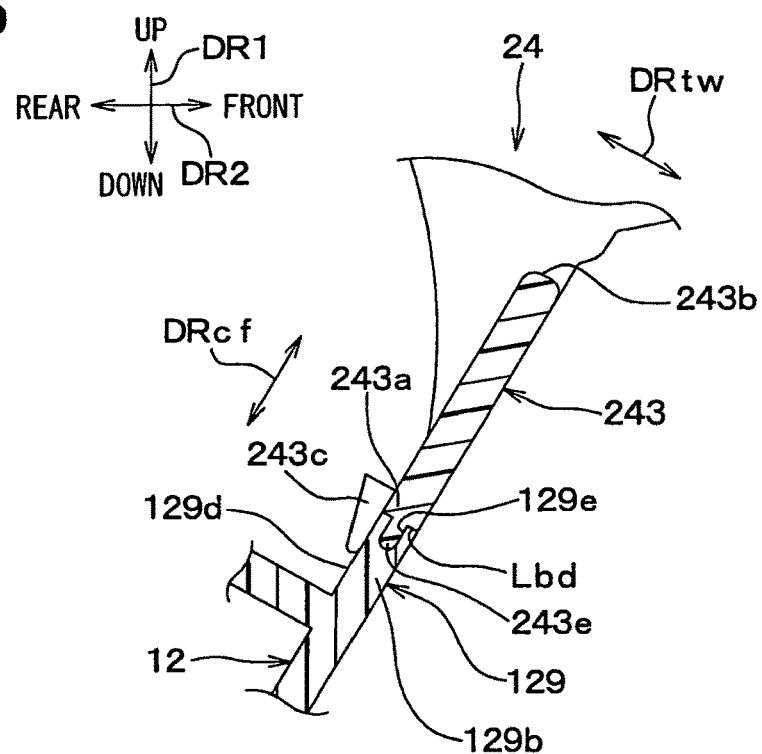
FIG. 15 is a cross-sectional view taken along a line XV-XV shown in FIG. 14.

As such, as shown in FIG. 14 and FIG. 15, the tunnel exterior guide wall 243 and the case wall 129 as a whole serve as a warm air guide that guides the warm air flowing into the first divided space 127a to flow along the first direction DS1 shown in FIG. 8. The warm air guide may be configured to promote mixing the cool air and the warm air in the first divided space 127a. Here, one wall of the tunnel exterior guide wall 243 and the case wall 129 may be the tunnel exterior guide wall 243, and the other wall of the tunnel exterior guide wall 243 and the case wall 129 may be the case wall 129.

Specifically, the case wall 129 extends from the tunnel exterior guide wall 243 and includes a notch 129a. The tunnel exterior guide wall 243 is fixed to the case wall 129 with the notch 129a of the case wall 129 engaged with the tunnel exterior guide wall 243.

For example, in order to fit the tunnel exterior guide wall 243 and the case wall 129, one of an edge of the tunnel exterior guide wall 243 and the notch 129a includes a fitting rib 243e protruding from the one of the edge of the tunnel exterior guide wall 243 and the notch 129a. At the same time, the other of the edge of the tunnel exterior guide wall 243 and the notch 129a includes a fitting groove 129e correspondingly to the fitting rib 243e. The tunnel exterior guide wall 243 comes in engagement with the notch 129a when the fitting rib 243e as a fitting portion of the one of the edge of the tunnel exterior guide wall 243 and the notch 129a is fitted into the fitting groove 129e as a fitting portion of the other of the edge of the tunnel exterior guide wall 243 and the notch 129a.

The case wall 129 is formed by two wall portions 129b, 129c. That is, the case wall 129 is formed of a first case wall portion 129b and a second case wall portion 129c different from the first case wall portion 129b. The first case wall portion 129b abuts on the second case wall portion 129c on a boundary 12a extending from the notch 129a. As such, the tunnel exterior guide wall 243 is in engagement with the case wall 129 in the notch 129a while being interposed between the first case wall portion 129b and the second case wall portion 129c in the vehicle width direction DR3. For example, the first case wall portion 129b may be a part of the first case member 121, and the second case wall portion 129c may be a part of the second case member 122.

In addition, the tunnel exterior guide wall 243 includes a first protrusion 243c and a second protrusion 243d. The first protrusion 243c is positioned on one side (or outside) of a surface 129d of the case wall 129 in the thickness direction DRtw of the tunnel exterior guide wall 243. Further, the first protrusion 243c protrudes from a boundary Lbd between the tunnel exterior guide wall 243 and the case wall 129 toward the case wall 129, and extends along the surface 129d of the case wall 129.

For example, the edge of the tunnel exterior guide wall 243 includes an abutting portion 243f where the tunnel exterior guide wall 243 abuts on the case wall 129 along an abutting direction DRcf, and the first protrusion 243c may be provided in the abutting portion 243f. The first protrusion 243c protrudes from the fitting rib 243e of the tunnel exterior guide wall 243 along the abutting direction DRcf. That is, a protruding amount of the first protrusion 243c toward the case wall 129 along the abutting direction DRcf is the greatest across the abutting portion 243f. The second protrusion 243d is also configured similarly to the above-described first protrusion 243c.

Here, the boundary Lbd includes an abutting portion where the tunnel exterior guide wall 243 abuts on the first case wall portion 129b. In the abutting portion, the tunnel exterior guide wall 243 includes the fitting rib 243e, and the first case wall portion 129b includes the fitting groove 129e. Further, the boundary Lbd includes an abutting portion where the tunnel exterior guide wall 243 abuts on the second case wall portion 129c. In the abutting portion, the second case wall portion 129c includes the fitting rib 243e, and the tunnel exterior guide wall 243 includes the fitting groove 129e.

Since the case wall 129 and the tunnel exterior guide wall 243 have the above-described configuration, a fitting operation may be performed as follows.

First, in a first step, the tunnel exterior guide wall 243 of the grid 24 is fitted into a portion of the first case wall portion 129b defining the notch 129a. Specifically, the fitting rib 243e of the tunnel exterior guide wall 243 is fitted into the fitting groove 129e of the first case wall portion 129b. At that time, the first protrusion 243c and the second protrusion 243d are arranged, along the surface 129d of the first case wall portion 129b of the case wall 129, so that the fitting rib 243e is guided into the fitting groove 129e.

In the subsequent second step, the first case member 121 and the second case member 122 are coupled with each other. In the second step, around the tunnel exterior guide wall 243 of the grid 24, the second case wall portion 129c comes in contact with the first case wall portion 129b and the tunnel exterior guide wall 243 with the tunnel exterior guide wall 243 fitted into the first case wall portion 129b. At the same time, the fitting rib 243e of the second case wall portion 129c is fitted into the fitting groove 129e of the tunnel exterior guide wall 243.

Next, the state of the door arrangement space 128 when the air conditioning unit 10 for a vehicle is operated in the bi-level mode will be described.

When the blowing mode is the bi-level mode, the outlet door 22 opens both of the foot outlet 131 and the face outlet 132 as shown in FIG. 3 and FIG. 5. In that case, the outlet door 22 is at the bi-level mode position shown in FIG. 3 and FIG. 5. At the bi-level mode position, the outlet door 22 divides the door arrangement space 128 into a foot-outlet space 128a and a face-outlet space 128b. The foot-outlet space 128a is open to both of the foot outlet 131 and the first divided space 127a. The face-outlet space 128b is open to both of the face outlet 132 and the second divided space 127b.

Here, partitioning the door arrangement space 128 by the outlet door 22 is not limited to partitioning the two spaces 128a, 128b completely. For example, the outlet door 22 divides the door arrangement space 128 roughly such that the two spaces 128a, 128b are not separated from each other completely. In the present embodiment, as shown in FIG. 3 and FIG. 5, the outlet door 22 divides the door arrangement space 128 roughly at the bi-level mode position.

When the outlet door 22 is at the bi-level mode position, at least a part of the door edge 222a of the door body 222 faces an edge 245c of the blade 245 and a part of the open end 127c of the second divided space 127b along a radial direction of the rotary shaft 221 perpendicular to the longitudinal axis CLd. For example, when the blowing mode is the bi-level mode, the outlet door 22 is positioned so that a position of the door edge 222a of the door body 222 in a circumferential direction of the rotary shaft 221 coincides with a position of a stepped portion 245d of the blade 245 shown in FIG. 10.

Next, a flow of air in the air conditioning case 12 will be described. As shown in FIGS. 3 and 5, when each of the warm air passage 125 and the cool air passage 126 is open and allows the air to pass therethrough, the air flowing out of the evaporator 16 flows into both the warm air passage 125 and the cool air passage 126.

The air flowing into the warm air passage 125 flows to the heater core 18 as shown by orientation indicator FH1. A part of the air (i.e., the warm air) passing through the heater core 18 and heated by the heater core 18 flows to the tunnel channel 244a of the grid 24 as shown by orientation indicator FH2a. At the same time, the rest of the warm air flows to the first divided space 127a as shown by orientation indicator FH2b.

The air flowing into the cool air passage 126 passes through the cool air passage 126 and then flows into the first divided space 127a as shown by orientation indicator FC1. At this time, since the cool air passage 126 is in communication with the first divided space 127a in the cool-air-passage connection direction DRc shown in FIG. 4, the air, i.e., the cool air, from the cool air passage 126 flows along the cool-air-passage connection direction DRc and flows into the first divided space 127a. In other words, in the downstream space 127, the cool air from the cool air passage 126 flows outside the tunnel member 244 across the tunnel member 244 from the cool air passage 126 to a side of the tunnel member 244 away from the cool air passage 126 along the cool-air-passage connection direction DRc.

The cool air flowing from the cool air passage 126 and passing through the first divided space 127a flows toward the door arrangement space 128 as shown by orientation indicator FC2 in FIG. 5. At that time, in the first divided space 127a, the warm air, which flows into the first divided space 127a as shown by orientation indicator FH2b, is mixed with the cool air, which flows as shown by orientation indicator FC2. In other words, in the downstream space 127, the cool air from the cool air passage 126 joins the warm air flowing from the warm air passage 125 into the downstream space 127, specifically into the outside of the tunnel member 244. For example, in a region M1 shown FIG. 5, the warm air from the warm air passage 125 and the cool air from the cool air passage 126 are mixed with each other.

As a result of mixing the warm air and the cool air, a mixed air is provided. That is, the warm air from the warm air passage 125 and the cool air from the cool air passage 126 become the mixed air while passing through the first divided space 127a, and then flow into the door arrangement space 128 as shown by orientation indicator FC2.

On the other hand, the warm air flowing into the tunnel channel 244a passes upward through the tunnel channel 244a as shown by orientation indicator FHtn in FIG. 3, and then flows into the second divided space 127b. In the second divided space 127b, the warm air flowing from the tunnel channel 244a into the second divided space 127b is diffused to both sides in the vehicle width direction DR3 as shown by orientation indicators ARa, ARb, ARc, and ARd in FIG. 10, and then flows into the door arrangement space 128 as shown by orientation indicator FH3.

In the door arrangement space 128, the warm air, which flows from the second divided space 127b into the door arrangement space 128, joins the mixed air, which flows from the first divided space 127a into the door arrangement space 128. For example, in a region M2 shown in FIG. 5, the warm air from the second divided space 127b and the mixed air from the first divided space 127a are mixed with each other. Then, the mixed air is discharged into the vehicle compartment from at least one of the air outlets 131, 132 being open.

That is, the grid 24 guides the warm air, which flows through the warm air passage 125, to flow upward in the downstream space 127, and allows the warm air to join the mixed air, which flows from the first divided space 127a, while being diffused along the vehicle width direction DR3 in the upper portion of the downstream space 127.

As shown in FIG. 3 and FIG. 5, when the outlet door 22 is at the bi-level mode position, mixing the warm air from the second divided space 127b and the cool air from the first divided space 127a in the door arrangement space 128 is suppressed by the outlet door 22, as compared with a case where the outlet door 22 is at the face mode position or the foot mode position. For example, the mixed air from the first divided space 127a may flow to the foot outlet 131 easier than flowing to the face outlet 132. On the other hand, the warm air from the second divided space 127b may flow to the face outlet 132 easier than flowing to the foot outlet 131.

As shown in FIG. 4 and FIG. 8, the first direction DS1, along which the the tunnel exterior guide wall 243 around the exterior-wall downstream end 243b extends, is directed to an upstream side of the cool air passage 126 along the cool-air-passage connection direction DRc rather than being directed to a downstream side of the cool air passage 126 along the cool-air passage connection direction DRc. As shown in FIG. 4 and FIG. 8, the second direction DS2, along which the tunnel exterior guide wall 244g around the tunnel-wall downstream end 244i extends, is directed to the downstream side of the cool air passage 126 along the cool-air-passage connection direction DRc rather than being directed to the upstream side of the cool air passage 126 along the cool-air passage connection direction DRc.

Figure 16:
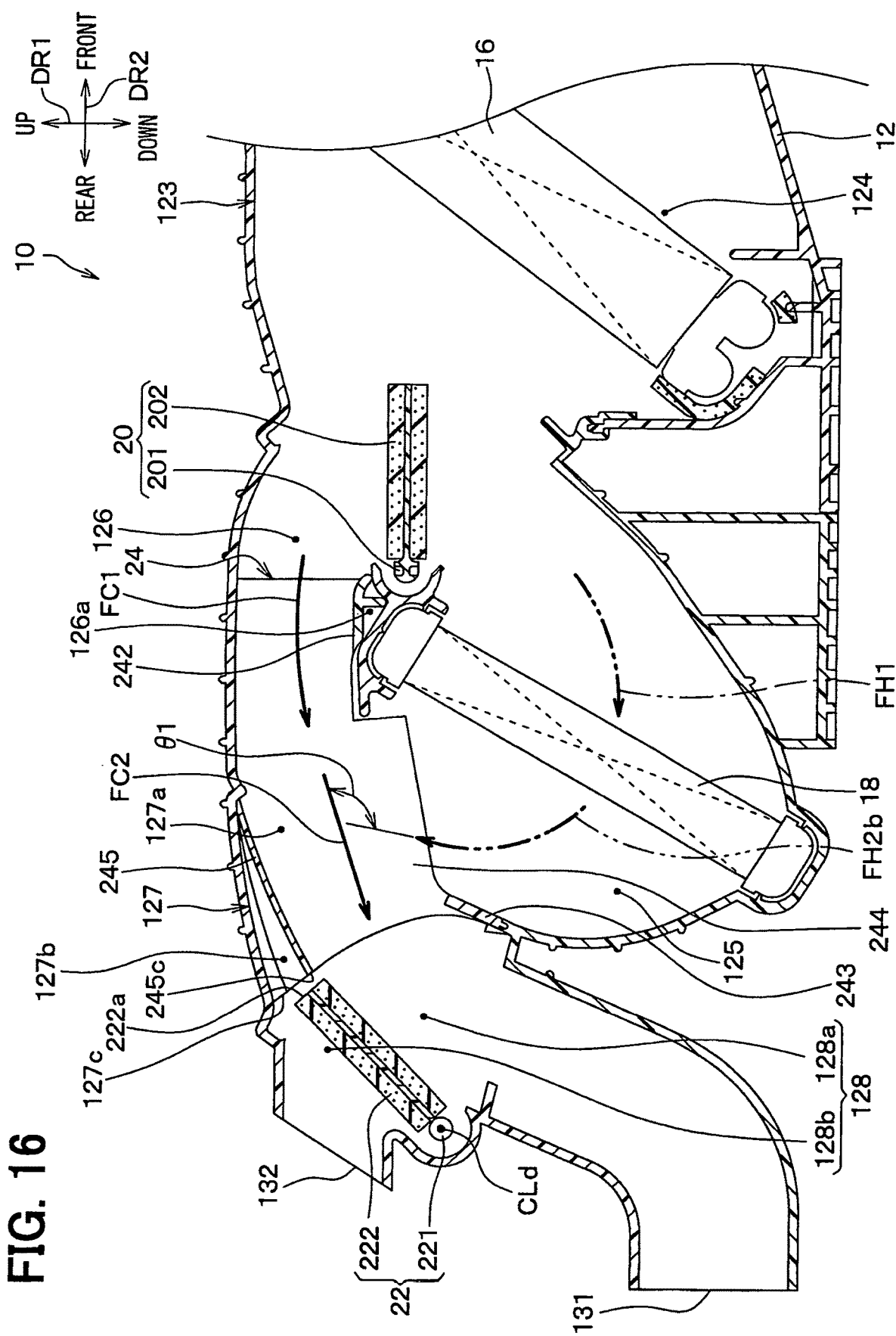
FIG. 16 is a diagram corresponding to the cross-sectional view of FIG. 5 and shows a collision angle formed by a flow direction of warm air relative to a flow direction of cool air in a first divided space included in a downstream space.
Figure 17:
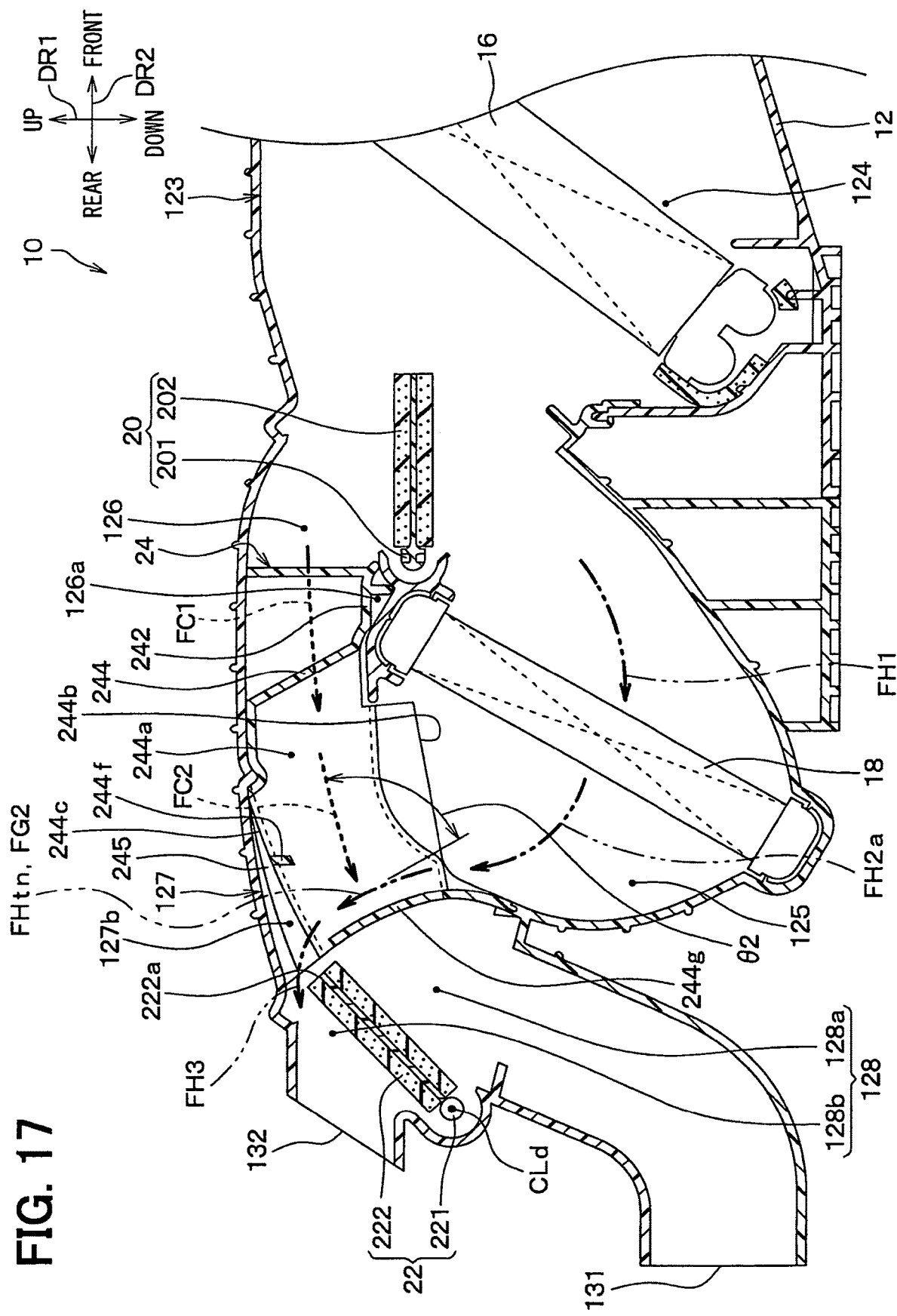
FIG. 17 is a diagram corresponding to the cross-sectional view of FIG. 3 and shows an intersection angle formed by a flow direction of warm air in the tunnel channel relative to a flow direction of cool air flowing through the first divided space.

Accordingly, as shown in FIG. 4, FIG. 8, and FIG. 11, the first direction DS1 is closer to a direction, which is opposite to a direction (or the cool-air-passage connection direction DRc) along which the air flowing from the cool air passage 126 into the downstream space 127, as compared to the second direction DS2. Therefore, the warm air joins the cool air in the first divided space 127a at a collision angle θ1 as shown in FIG. 16. Further, a flow direction of the warm air in the tunnel channel 244a intersects with a flow direction of the cool air in the first divided space 127a at an intersecting angle θ2 as shown in FIG. 17. The collision angle θ1 is greater than the intersecting angle θ2.

More specifically, the collision angle θ1 is an angle at which the warm air flowing into the first divided space 127a collides with the cool air passing through the first divided space 127a when the flow direction of the air in the downstream space 127 is projected on a virtual plane with the normal direction coinciding with the vehicle width direction DR3.

The intersecting angle θ2 is an angle at which the flow direction of the warm air in the tunnel channel 244a relative to the flow direction of the cool air passing through the first divided space 127a when the flow direction of the air in the downstream space 127 is projected on the virtual plane. For example, the flow direction of the warm air flowing in the tunnel channel 244a to form the intersecting angle θ2 may be a flow direction of the air flowing through the downstream end 244c of the tunnel channel 244a preferably. Further, the flow direction of the cool air forming the intersecting angle θ2 may be the same as the flow direction of the cool air forming the collision angle θ1 preferably.

Here, orientation indicators FC1, FC2 shows flow directions of the air outside the tunnel channel 244a in FIG. 17. As such, in FIG. 17, parts of orientation indicators FC1, FC2 overlapping with the grid 24 are shown by dashed lines.

As described above, in the present embodiment, the first direction DS1 along which the tunnel exterior guide wall 243 extends is closer to the direction, which is opposite to the direction along which the air flowing from the cool air passage 126 into the downstream space 127, as compared to the second direction DS2 along which the tunnel guide wall 244g extends, as shown in FIG. 4, FIG. 8, and FIG. 11

As a result, the air flows through the tunnel channel 244a smoothly. As such, a pressure loss (e.g., a ventilation resistance in the tunnel channel 244a) caused by the grid 24 can be prevented from increasing, therefore a sufficient volume of the warm air flowing through the tunnel channel 244a can be secured. At the same time, the warm air, which is guided by the tunnel exterior guide wall 243 to flow to the outside of the tunnel member 244 in the downstream space, is allowed to join the cool air from the cool air passage 126 while the flow direction of the warm air flowing into the outside of the tunnel member 244 is closer to an opposite direction, which is opposite to the flow direction of the cool air flowing from the cool air passage 126, as compared to the flow direction of the warm air flowing through the tunnel channel 244a. Therefore, mixing the warm air guided by the tunnel exterior guide wall 243 with the cool air from the cool air passage 126 can be promoted. As a result, the temperature variation of the air discharged from the air conditioning unit 10 for a vehicle can be reduced. In addition, a temperature difference possibly caused in the air along the vehicle up-down direction DR1 can be reduced.

Moreover, in the present embodiment, as shown in FIG. 3, FIG. 5, and FIG. 11, the tunnel member 244 includes the tunnel-wall upstream end 244h that is located upstream of the exterior-wall downstream end 243b in the first flow direction FG1. As such, an opening area of the tunnel member 244 to the warm air passage 125 can be secured large as compared to a case where the tunnel-wall upstream end 244h is located downstream of the exterior-wall downstream end 243b in the first flow direction FG1. Thus, a volume of the warm air flowing through the tunnel channel 244a can be increased.

Furthermore, in the present embodiment, the first direction DS1 is directed to the upstream side of the cool air passage 126 along the cool-air-passage connection direction DRc rather than being directed to a downstream side of the cool air passage 126 along the cool-air passage connection direction DRc as shown in FIG. 4 and FIG. 8. In addition, the second direction DS2 is directed to the downstream side of the cool air passage 126 along the cool-air-passage connection direction DRc rather than being directed to the upstream side of the cool air passage 126 along the cool-air passage connection direction DRc as shown in FIG. 4 and FIG. 11 As such, the ventilation resistance in the tunnel channel 244a can be reduced while promoting mixing the warm air guided by the tunnel exterior guide wall 243 and the cool air from the cool air passage 126.

In the present embodiment, as shown in FIG. 3, the door edge 222a moves along the rotational path TKd when the door body 222 of the outlet door 22 rotates, and the tunnel guide wall 244g is spaced from the rotational path TKd in the radial direction perpendicular to the rotational axis CLd. In addition, the tunnel guide wall 244g is curved along the rotational path TKd of the door edge 222a. As a result, the ventilation resistance in the tunnel channel 244a can be reduced in an area where the tunnel guide wall 244g does not interfere with the outlet door 22.

In the present embodiment, as shown in FIG. 3, FIG. 5, FIG. 12, and FIG. 13, the upstream end forming portion 244d of the tunnel member 244 forms the upstream end 244b so that the width of the upstream end 244b in the thickness direction DRt is greater than the width of the intermediate portion of the tunnel channel 244a in the thickness direction DRt. As such, the opening area of the tunnel member 244 to the warm air passage 125 can be secured large as compared to a case where the width of the upstream end 244b is not increased. Thus, a volume of the warm air flowing through the tunnel channel 244a can be increased.

The upstream end forming portion 244d is positioned outside the area through which the main flow of the cool air, which flows from the cool air passage 126 into the downstream space 127 and passes through the downstream space 127, flows. Therefore, the opening area of the tunnel member 244 can be enlarged without interrupting the flow of the cool air from the cool air passage 126.

In the present embodiment, as shown in FIG. 14 and FIG. 15, the case wall 129 is formed of the first case wall portion 129b and the second case wall portion 129c different from the first case wall portion 129b. The first case wall portion 129b abuts on the second case wall portion 129c on the boundary 12a extending from the notch 129a. The tunnel exterior guide wall 243 is fixed to the case wall 129 with the notch 129a of the case wall 129 engaged with the tunnel exterior guide wall 243. Therefore, the tunnel exterior guide wall 243 can come in engagement with the notch 129a by performing the fitting operation with the divided case wall 129 divided by the boundary 12a. In addition, since the tunnel exterior guide wall 243 is in engagement with the notch 129a, a leak of air via the boundary Lbd between the tunnel exterior guide wall 243 and the case wall 129 can be suppressed.

In the present embodiment, the first protrusion 243c is positioned on one side of the surface 129d of the case wall 129 in the thickness direction DRtw of the tunnel exterior guide wall 243. The first protrusion 243c is formed to protrude from the boundary Lbd between the tunnel exterior guide wall 243 and the case wall 129 toward the case wall 129 and to extend along the surface 129d of the case wall 129. The second protrusion 243d of the tunnel exterior guide wall 243 has a similar configuration to the first protrusion 243c.

Therefore, the fitting operation in which the tunnel exterior guide wall 243 comes in engagement with the notch 129a can be performed easily since the tunnel exterior guide wall 243 is guided by the first protrusion 243c and the second protrusion 243d when fitting the tunnel exterior guide wall 243 is fitted into the notch 129a. Thus, the assembling efficiency of the grid 24 with the first case member 121 and the second case member 122 can be improved, and at the same time the leakage of the air can be suppressed.

In the present embodiment, the edge of the tunnel exterior guide wall 243 includes the abutting portion 243f where the tunnel exterior guide wall 243 abuts on the case wall 129 along an abutting direction DRcf, and the first protrusion 243c may be provided in the abutting portion 243f. The protruding amount of the first protrusion 243c toward the case wall 129 along the abutting direction DRcf is the greatest across the abutting portion 243f. As such, when the tunnel exterior guide wall 243 comes in engagement with the notch 129a of the case wall 129, the first protrusion 243c comes in contact with the case wall 129 first. As a result, the fitting operation in which the first protrusion 243c guides the tunnel exterior guide wall 243 to come in engagement with the notch 129a can be performed easily.

Other Embodiments (1) In the above-described embodiment, the air conditioning unit 10 for a vehicle shown in FIG. 1 is specifically an air conditioning unit for a rear seat. However the air conditioning unit 10 may not be limited to the air conditioning unit for a rear seat. The air conditioning unit 10 may be mounted in any areas in the vehicle. For example, the air conditioning unit 10 may be an air conditioning unit that is positioned in a front area of the vehicle compartment and that supplies the conditioned air from the instrument panel.

(2) In the above-described embodiment, the air conditioning unit 10 for a vehicle includes the evaporator 16. However, the air conditioning unit 10 for a vehicle may not include the evaporator 16, e.g., when the air conditioning unit 10 is used in an environment where it is not necessary to cool the air introduced into the air conditioning case 12.

(3) In the above-described embodiment, the grid 24 is fixed to the air conditioning case 12 by being in engagement with the air conditioning case 12. However, the way of the fixing is not limited to a specific way. For example, the grid 24 is fixed to the air conditioning case 12 by a click or an adhesive.

(4) In the above-described embodiment, the tunnel-wall upstream end 244h coincides with the exterior-wall upstream end 243a in the first flow direction FG1 as shown in FIG. 3, FIG. 5, and FIG. 11. However, the position of the tunnel-wall upstream end 244h in the first flow direction FG1 may not necessarily coincide with the exterior-wall upstream end 243a as long as the tunnel-wall upstream end 244h is positioned upstream of the exterior-wall upstream end 243a.

(5) In the above-described embodiment, the tunnel guide wall 244g is curved, e.g., to have an arc shape, along the rotational path TKd of the door edge 222a of the outlet door 22 as shown in FIG. 3. However, the shape of the tunnel guide wall 244g is not limited to a specific shape as long as the tunnel guide wall 244g does not interfere with the outlet door 22 and does not narrow the tunnel channel 244a unnecessarily. For example, the tunnel guide wall 244g may have a polygonal shape rather than the curved shape.

The second direction DS2 along which the tunnel guide wall 244g extends as shown in FIG. 11 and the position of the tunnel-wall upstream end 244h may be set as required depending on a required volume of the warm air flowing through the tunnel channel 244a.

(6) In the above-described embodiment, the tunnel exterior guide wall 243 includes the first protrusion 243c and the second protrusion 243d as shown in FIG. 14 and FIG. 15. In this configuration, the first protrusion 243c and/or the second protrusion 243d may be provided with the case wall 129, not with the tunnel exterior guide wall 243. Alternatively, the first protrusion 243c and/or the second protrusion 243d may not be provided necessarily.

(7) In the above-described embodiment, as shown in FIG. 6, FIG. 7 and FIG. 10, the tunnel member 244 of the grid 24 is positioned substantially at the center of the downstream space 127 along the vehicle width direction DR 3. However, the tunnel member 244 may be positioned at the end of the downstream space 127. The quantity of the tunnel member 244 may be two or more. The optimum position, the quantity, and the width of the tunnel member 244 may be set as required based on the temperature variation of the conditioned air and the temperature difference along the vehicle up-down direction DR 1.

(8) In the above-described embodiment, the blade 245 of the grid 24 has the stepped shape as shown in FIG. 10, and the number of the step thereof is one for each of the left and right sides. However, the number of the step is not limited to a specific quantity. Alternatively, the blade 245 may not have a stepped shape. A height of the step, a position, a quantity of the step of the blade 245 may be set as required based on the temperature variation of the conditioned air and the temperature difference along the vehicle up-down direction DR1. For example, it is preferable that the width of the second divided space 127b along the arrangement direction DRi shown in FIG. 5 may be increased as approaching the center in the vehicle width direction DR3.

Alternatively, the blade 245 of the grid 24 may not have the stepped shape. For example, the width (i.e., a position) of the blade 245 in the vehicle up-down direction DR1 may change continuously so that the width of the second divided space 127b in the arrangement direction DRi may increase as approaching the center of the blade 245 along the vehicle width direction DR3. In that case, the shape of the blade 245 may be set as required based on the temperature variation of the conditioned air and the temperature difference along the vehicle up-down direction DR 1.

(9) In the above-described embodiment, the blade 245 of the grid 24 has a substantially symmetrical shape along the vehicle width direction DR3, however the shape is not limited to be symmetrical and may be asymmetrical.

(10) In the above-described embodiment, the outlet door 22 is a cantilever rotating door in which the rotary shaft 221 is attached to one end of the door body 222. However, for example, the outlet door 22 may be a butterfly door with the rotary shaft 221 attached to a center portion of the door body 222. Such configuration may be applied to the air mix door 20.

The foregoing description of the embodiment has been provided for purposes of illustration and description. However, it is not intended to be exhaustive or to limit the embodiment. The present disclosure is intended to cover various modification and equivalent arrangements. Individual elements or features of a particular embodiment are not necessarily essential unless it is specifically stated that the elements or the features are essential in the foregoing description, or unless the elements or the features are obviously essential in principle.

A quantity, a value, an amount, a range, or the like, if specified in the above-described example embodiments, is not necessarily limited to the specific value, amount, range, or the like unless it is specifically stated that the value, amount, range, or the like is necessarily the specific value, amount, range, or the like, or unless the value, amount, range, or the like is obviously necessary to be the specific value, amount, range, or the like in principle. Furthermore, a material, a shape, a positional relationship, or the like, if specified in the above-described example embodiments, is not necessarily limited to the specific material, shape, positional relationship, or the like unless it is specifically stated that the material, shape, positional relationship, or the like is necessarily the specific material, shape, positional relationship, or the like, or unless the material, shape, positional relationship, or the like is obviously necessary to be the specific material, shape, positional relationship, or the like in principle.

Conclusion

In a first aspect described in a part or an entire of the above-described embodiment, the tunnel exterior guide wall around the exterior-wall downstream end extends along a first direction, the tunnel guide wall around the tunnel-wall downstream end extends along a second direction, and the first direction is closer to a direction, which is opposite to the one direction along which the air flowing from the cool air passage into the downstream space, as compared to the second direction.

In a second aspect, the tunnel-wall upstream end is positioned upstream of the exterior-wall downstream end in the first flow direction. The first flow direction is the direction along which the air flows from the warm air passage into the downstream space along the tunnel exterior guide wall. As such, the opening area of the tunnel member to the warm air passage can be secured large as compared to the case where the tunnel-wall upstream end is located downstream of the exterior-wall downstream end in the first flow direction. Thus, a volume of the air flowing through the tunnel channel can be increased.

In a third aspect, the first direction is directed to the upstream side of the cool air passage along the cool-air-passage connection direction (or the one direction) rather than being directed to a downstream side of the cool air passage along the cool-air passage connection direction (or the one direction). In addition, the second direction is directed to the downstream side of the cool air passage in the one direction rather than being directed to the upstream side of the cool air passage in the one direction. As such, the ventilation resistance in the tunnel channel can be reduced while promoting mixing the air guided by the tunnel exterior guide wall and the air from the cool air passage.

In a fourth aspect, the door edge moves along the rotational path when the door body rotates, and the tunnel guide wall is spaced from the rotational path in the radial direction perpendicular to the rotational axis and is curved along the rotational path. As a result, the ventilation resistance in the tunnel channel can be reduced in the area where the tunnel guide wall does not interfere with the second space door.

In a fifth aspect, the upstream end forming portion of the tunnel member forms the upstream end so that the width of the upstream end in the thickness direction is greater than a width of an intermediate portion of the tunnel channel in the thickness direction. As such, the opening area of the tunnel to the warm air passage can be secured large as compared to a case where the width of the upstream end is not increased. Thus, a volume of the air flowing through the tunnel channel can be increased.

The upstream end forming portion of the tunnel member is positioned outside the area through which the main flow of the air, which flows from the cool air passage into the downstream space and passes through the downstream space, flows. Therefore, the opening area of the tunnel member can be enlarged without interrupting the flow of the cool air from the cool air passage.

In a sixth aspect, the case wall includes the notch, the first case wall portion, and the second case wall portion different from the first case wall portion. The first case wall portion abuts on the second case wall portion on the boundary extending from the notch. The tunnel exterior guide wall is fixed to the case wall with the notch engaged with the tunnel exterior guide wall. Therefore, the tunnel exterior guide wall can come in engagement with the notch easily. In addition, since the tunnel exterior guide wall is in engagement with the notch, a leak of the air via the boundary between the tunnel exterior guide wall and the case wall can be suppressed.

In a seventh aspect, one wall of the tunnel exterior guide wall and the case wall includes the protrusion. The protrusion is positioned on one side of the surface of the other wall of the tunnel exterior guide wall and the case wall in the thickness direction of the one wall. The protrusion is formed to protrude from the boundary between the one wall and the other wall of the tunnel exterior guide wall and the case wall toward the other wall and to extend along the surface of the other wall. Therefore, the fitting operation in which the tunnel exterior guide wall comes in engagement with the notch can be performed easily since the tunnel exterior guide wall is guided by the protrusion when fitting the tunnel exterior guide wall is fitted into the notch.

In an eighth aspect, the protrusion is at a portion where the one wall abuts on the other wall in the abutting direction. In addition, a protruding amount of the protrusion protruding toward the other wall along an abutting direction is the greatest across the portion. As such, when the tunnel exterior guide wall comes in engagement with the notch of the case wall, the first protrusion comes in contact with the case wall first. As a result, the fitting operation in which the protrusion guides the tunnel exterior guide wall to come in engagement with the notch can be performed easily.

What is claimed is:
1. An air conditioning unit that is configured to perform an air conditioning for a vehicle compartment, comprising:
    an air conditioning case that defines a warm air passage, a cool air passage, and a downstream space therein,
        the warm air passage allowing air to flow therethrough and to be heated in a heater,
        the cool air passage allowing air to flow therethrough while bypassing the heater,
        the downstream space defined on a downstream side of the warm air passage and on a downstream side of the cool air passage,
        the warm air passage and the cool air passage being connected to each other in the downstream space; and
    a case interior member in the air conditioning case, wherein
    the cool air passage is in fluid communication with the downstream space in a cool air flow direction,
    the case interior member includes
        a tunnel member that defines a tunnel channel therein passing through the tunnel member in a direction intersecting with the cool air flow direction and
        a tunnel exterior guide wall that is configured to guide an air to flow from the warm air passage to an outside of the tunnel channel in the downstream space,
    the tunnel member is open to the warm air passage at an upstream end of the tunnel channel, and includes a tunnel guide wall that faces the tunnel channel and that is configured to guide an air flowing through the tunnel channel, in the downstream space, the air from the cool air passage flows outside the tunnel member across the tunnel member from the cool air passage to a side of the tunnel member away from the cool air passage along the cool air flow direction, and joins the air flowing from the warm air passage into the outside of the tunnel member, the tunnel exterior guide wall includes an exterior-wall downstream end that is located most downstream in the tunnel exterior guide wall in a first flow direction along which the air flows from the warm air passage into the downstream space along the tunnel exterior guide wall, the tunnel guide wall includes a tunnel-wall downstream end in a second flow direction along which the air flows along the tunnel guide wall in the tunnel channel, the tunnel exterior guide wall around the exterior-wall downstream end extends along a first direction, the tunnel guide wall around the tunnel-wall downstream end extends along a second direction, and the first direction is closer to a direction, which is opposite to the cool air flow direction along which the air flowing from the cool air passage into the downstream space, as compared to the second direction, wherein the air conditioning case includes a case wall that extends from the tunnel exterior guide wall, the case wall includes a notch, a first case wall portion, and a second case wall portion, the first case wall portion and the second case wall portion being separate members, the first case wall portion abuts on the second case wall portion on a boundary extending from the notch, and the tunnel exterior guide wall is fixed to the case wall with the notch engaged with the tunnel exterior guide wall.

2. The air conditioning unit for a vehicle according to claim 1, wherein the warm air passage includes a connection end where the warm air passage is connected to the downstream space, the tunnel guide wall in the tunnel member is positioned furthermost from the cool air passage in the cool air flow direction and includes a tunnel-wall upstream end in the second flow direction, the tunnel exterior guide wall defines a part of the connection end of the warm air passage, the part of the connection end being positioned furthermost in the connection end from the cool air passage in the cool air flow direction, and the tunnel-wall upstream end is positioned upstream of the exterior-wall downstream end in the first flow direction.

3. The air conditioning unit for a vehicle according to claim 1, wherein the first direction and the cool air flow direction form an obtuse angle, and the second direction and the cool air flow direction form an acute angle.

4. The air conditioning unit for a vehicle according to claim 1, further comprising a second space door that includes a door body configured to rotate about a door rotational axis, wherein the air conditioning case defines a second space therein that is connected to the downstream space as a first space on a side of the downstream space away from the cool air passage, the second space door is arranged in the second space, the door body includes a door edge that is positioned between the door rotational axis and the first space, the door edge moves along a rotational path when the door body rotates, and the tunnel guide wall is spaced from the rotational path in a radial direction perpendicular to the rotational axis and is curved along the rotational path.

5. The air conditioning unit for a vehicle according to claim 1, wherein the tunnel member has a flat portion and an upstream end portion, the flat portion having a longitudinal direction along the cool air flow direction, and the upstream end portion forms an upstream end of the tunnel channel so that a width of the upstream end in a thickness direction of the tunnel member is greater than a channel width of a center portion of the tunnel channel and is arranged outside an area where a main flow of the air, which flows from the cool air passage into the downstream space and passes through the downstream space, flows.

6. The air conditioning unit for a vehicle according to claim 1, further comprising one wall of the tunnel exterior guide wall and the case wall includes a protrusion, and the protrusion is positioned on one side of a surface of an other wall of the tunnel exterior guide wall and the case wall in a thickness direction of the one wall and formed to protrude from a boundary between the one wall and the other wall toward the other wall and to extend along the surface of the other wall.

7. The air conditioning unit for a vehicle according to claim 6, wherein the protrusion is located at an edge portion of the one wall where the one wall abuts on the other wall, and the protrusion protrudes from the one wall toward the other wall across the edge portion.

8. An air conditioning unit that is configured to perform an air conditioning for a vehicle compartment, comprising:

an air conditioning case that defines a warm air passage, a cool air passage, and a downstream space therein, the warm air passage allowing air to flow therethrough and to be heated in a heater, the cool air passage allowing air to flow therethrough while bypassing the heater, the downstream space defined on a downstream side of the warm air passage and on a downstream side of the cool air passage, the warm air passage and the cool air passage being connected to each other in the downstream space; and a case interior member in the air conditioning case, wherein the cool air passage is in fluid communication with the downstream space in a cool air flow direction, the case interior member includes a tunnel member that defines a tunnel channel therein passing through the tunnel member in a direction intersecting with the cool air flow direction and a tunnel exterior guide wall that is configured to guide an air to flow from the warm air passage to an outside of the tunnel channel in the downstream space, the tunnel member is open to the warm air passage at an upstream end of the tunnel channel, and includes a tunnel guide wall that faces the tunnel channel and that is configured to guide an air flowing through the tunnel channel, in the downstream space, the air from the cool air passage flows outside the tunnel member across the tunnel member from the cool air passage to a side of the tunnel member away from the cool air passage along the cool air flow direction, and joins the air flowing from the warm air passage into the outside of the tunnel member, the tunnel exterior guide wall includes an exterior-wall downstream end that is located most downstream in the tunnel exterior guide wall in a first flow direction along which the air flows from the warm air passage into the downstream space along the tunnel exterior guide wall, the tunnel guide wall includes a tunnel-wall downstream end in a second flow direction along which the air flows along the tunnel guide wall in the tunnel channel, the tunnel exterior guide wall around the exterior-wall downstream end extends along a first direction, the tunnel guide wall around the tunnel-wall downstream end extends along a second direction, and the first direction is closer to a direction, which is opposite to the cool air flow direction along which the air flowing from the cool air passage into the downstream space, as compared to the second direction, wherein the air conditioning case includes a case wall that extends from the tunnel exterior guide wall, the case wall includes a notch, a first case wall portion, and a second case wall portion different from the first case wall portion, the first case wall portion abuts on the second case wall portion on a boundary extending from the notch, the tunnel exterior guide wall is fixed to the case wall with the notch engaged with the tunnel exterior guide wall, and one wall of the tunnel exterior guide wall and the case wall includes a protrusion, the protrusion is positioned on one side of a surface of an other wall of the tunnel exterior guide wall and the case wall in a thickness direction of the one wall and formed to protrude from a boundary between the one wall and the other wall toward the other wall and to extend along the surface of the other wall.

* * * * *